(12) United States Patent
Crane et al.

(10) Patent No.: US 12,156,605 B1
(45) Date of Patent: Dec. 3, 2024

(54) PLANT MIXTURE PROCESSING SYSTEMS

(71) Applicant: C. Crane, Fortuna, CA (US)

(72) Inventors: Robert C. Crane, Fortuna, CA (US); Isaiah Hahner, Fortuna, CA (US)

(73) Assignee: C. Crane, Fortuna, CA (US)

( * ) Notice: Subject to any disclaimer, the term of this patent is extended or adjusted under 35 U.S.C. 154(b) by 0 days.

(21) Appl. No.: 17/862,264

(22) Filed: Jul. 11, 2022

Related U.S. Application Data

(63) Continuation of application No. 17/330,387, filed on May 25, 2021, now Pat. No. 11,382,448, which is a continuation-in-part of application No. 17/238,198, filed on Apr. 22, 2021, now abandoned.

(51) Int. Cl.

| | | |
|---|---|---|
| *A47J 19/00* | (2006.01) | |
| *A47J 31/60* | (2006.01) | |
| *B01D 25/12* | (2006.01) | |
| *B01D 29/35* | (2006.01) | |
| *B01D 29/64* | (2006.01) | |
| *B01D 29/90* | (2006.01) | |
| *B01D 35/28* | (2006.01) | |
| *B01D 35/30* | (2006.01) | |
| *B30B 9/06* | (2006.01) | |

(52) U.S. Cl.
CPC .............. *A47J 19/005* (2013.01); *A47J 31/60* (2013.01); *B01D 25/12* (2013.01); *B01D 29/35* (2013.01); *B01D 29/6476* (2013.01); *B01D 29/90* (2013.01); *B01D 35/28* (2013.01); *B30B 9/06* (2013.01); *B01D 35/30* (2013.01); *B01D 2201/0423* (2013.01); *B01D 2201/08* (2013.01); *B01D 2201/202* (2013.01); *B01D 2201/4015* (2013.01)

(58) Field of Classification Search
CPC ......... A47J 19/005; A47J 31/60; B01D 24/44; B01D 25/12; B01D 29/35; B01D 29/6476; B01D 29/60; B01D 35/28; B01D 35/30; B01D 2201/08; B01D 2201/202; B01D 2201/4015; B30B 9/06
See application file for complete search history.

(56) References Cited

U.S. PATENT DOCUMENTS

| | | | |
|---|---|---|---|
| 1,412,029 A | 4/1922 | Galdi et al. | |
| 1,689,277 A | 10/1928 | Burns | |
| 1,889,543 A | 11/1932 | Coors | |
| 2,333,890 A * | 11/1943 | Russell | ................. B01D 27/08 210/440 |
| 3,368,800 A | 2/1968 | Barnard | |

(Continued)

FOREIGN PATENT DOCUMENTS

| | | |
|---|---|---|
| EP | 2798985 | 11/2014 |
| WO | WO2012025125 | 1/2012 |

OTHER PUBLICATIONS

Almond Cow; "The future of plant-based milk is delightful"; Almond Cow website; https://almondcow.co/; at least as early as Sep. 7, 2020; 7 pages.

(Continued)

*Primary Examiner* — Liam Royce
(74) *Attorney, Agent, or Firm* — Law Office of Karen Dana Oster, LLC

(57) ABSTRACT

A processing system for processing plant mixture into milk and pulp preferably includes a filter, a plunger mechanism, and a ring funnel. The processing system may also include a pulp catcher.

19 Claims, 17 Drawing Sheets

(56) References Cited

U.S. PATENT DOCUMENTS

| | | | |
|---|---|---|---|
| 5,419,250 | A | 5/1995 | Ferguson |
| 5,656,321 | A | 8/1997 | Berger et al. |
| 6,135,019 | A | 10/2000 | Chou |
| 7,430,957 | B2 | 10/2008 | Sands |
| 9,084,512 | B2 | 7/2015 | Boozer |
| 10,334,986 | B2 | 7/2019 | Gross et al. |
| 10,349,771 | B2 | 7/2019 | Monforte Duart |
| 2005/0068847 | A1 | 3/2005 | Sands |
| 2005/0199129 | A1 | 9/2005 | Glucksman et al. |
| 2020/0155977 | A1 | 5/2020 | Burns et al. |

OTHER PUBLICATIONS

Amazon; "Chef'n Nut Milk Maker, Recipes included, Blue"; Amazon website; https://www.amazon.com/Chefn-Milk-Maker-Recipes-included/dp/B083XB7GSZ; at least as early as Aug. 12, 2020; 9 pages.

Amazon; "Lekue Nut, Almond Milk & Grain Milk Maker, 1 Quart, Brown"; Amazon website; https://amazon.com/Lekue-0220526M06M500-Almond-Grain-Maker/dp/B07Q9WV234; Apr. 2, 2019; 4 pages.

Amazon; "Mad Millie Hard Cheese Press Kit with Pressure Gauge"; Amazon website; https://www.amazon.com/Mad-Millie-Cheese-Press/dp/B071KTRBNB/ref=cm_cr_arp_d_product_top?ie=UTF8; posted Dec. 4, 2012, page last accessed Apr. 5, 2021; 9 pages.

Amazon; "Winco CCB-8R Stainless Steel Reinforced Bouillon Strainer, 8 inch—1 Each"; Amazon website; https://www.amazon.com/Winco-CCB-8R-Stainless-Reinforced-Bouillon/dp/B001L68ARC/ref=asc_df_B001L68ARC/?tag=hyprod-20&linkCode=df0&hvadid=198075824790&hvpos=&hvnet; posted Oct. 7, 2007, page last accessed Apr. 5, 2021; 8 pages.

Amazon Customers; "Customer Reviews: Almond Cow: The Plant-Based Milk Maker"; Amazon website; https://www.amazon.com/Almond-Cow-Plant-Based-Milk-Maker/product-reviews/B06XP4WFTP/ref=cm_cr_getr_d_paging_btm_next_3?reviewerType=all_reviews&pageNumber=3; reviews as of Aug. 25, 2020; 5 pages.

Cheney, Dina; "The New Milks: 100-Plus Dairy-Free Recipes for Making and Cooking with Soy, Nut, Seed, Grain, and Coconut Milks"; ATRIA Paperback, An Imprint of Simon & Schuster, Inc., New York, NY; May 2016; 3 pages.

discountjuicers.com; "Best Machine to Make Nut Milk: Nutramilk vs Hurom Juicer"; video transcript; YouTube website; available at https://www.youtube.com/watch?v=LN7E-C7mrYc; Jun. 28, 2018; 7 pages.

Ebay Seller; "Mad&Millie Artisan Cheese Making Kit, Make Your Own Cheese at Home"; eBay website; https://www.ebay.com/itm/Mad-Millie-ARTISAN-CHEESE-MAKING-KIT-Make-Your-Own-Cheese-at-Home/151507999989?epid=1325007599&hash=item2346949cf5:g:Oh8AAOSw1x1UOsj8; page last updated Jan. 4, 2021 as of Feb. 20, 2021; 8 pages.

Ebay Seller; "Mad&Millie Hard Cheese Press 2.0L Cheese Making Press", eBay website; https://www.ebay.com/itm/Mad-Millie-HARD-CHEESE-PRESS-2-0L-CHEESE-MAKING-PRESS-/161444280549; page last updated Oct. 14, 2020 as of Apr. 5, 2021; 8 pages.

Grommet, The; "Plant-Based & Nut Milk Maker by Lekue"; the Grommet website; thegrommet.com/products/lekue-nut-and-plant-based-milk-maker; at least as early as Mar. 1, 2021; 9 pages.

Industrial Specialties Mfg. (ISM); "Mesh and Micron Sizes"; ISM website; https://www.industrialspec.com/resources/mesh-and-micron-sizes; at least as early as Aug. 25, 2020; 5 pages.

Klein, Margeaux Baulch; "For Silky Smooth Homemade Soups & Sauces, You Need One Of These Chinois Strainers | The 3 Best Chinois Strainers"; Bustle article; Bustle website; https://www.bustle.com/p/the-3-best-chinois-strainers-22601167; Apr. 4, 2020; 5 pages.

Macdonald, et al.; "A systematic review and meta-analysis of the effects of pasteurization on milk vitamins, and evidence for raw milk consumption and other health-related outcomes"; article abstract; Journal of Food Protection; 74(11): 1814-32. doi: 10.4315/0362-028X.JFP-10-269; also available at https://www.ncbi.nlm.nih.gov/pubmed/22054181; Nov. 2011; 2 pages.

Mintel Press Office; "US Non-Dairy Milk Sales Grow 61% over the Last Five Years"; Mintel Group Ltd. website; https://www.mintel.com/press-centre/food-and-drink/US-non-dairy-milk-sales-grow-61-over-the-last-five-years; Jan. 4, 2018; 8 pages.

My Slice of Life; "Mad Millie 2L Hard Cheese Press"; My Slice of Life website; https://mysliceoflife.com.au/product/mad-millie-artisan-cheese-making-kit/; at least as early as Feb. 20, 2021; 4 pages.

NIH—Genetics Home Reference, "Lactose intolerance"; NIH—U.S. National Library of Medicine website; https://ghr.nlm.nih.gov/condition/lactose-intolerance#:~:text=Approximately%2065%20percent%20of%20the,people%20affected%20in%20these%20communities; page last reviewed May 2010, page last updated Aug. 17, 2020; 6 pages.

Plant Milk; "LIDL illegally copies CHUFAMIX patented invention"; Plant Milk website; https://www.plantmilk.org/lidl-illegally-copies-chufamix-patented-invention/; Apr. 30, 2018; 5 pages.

President and Fellows of Harvard College, The; "The Nutrition Source: Almonds"; Harvard T.H. Chan School of Public Health website; https://www.hsph.harvard.edu/nutritionsource/food-features/almonds/; at least as early as Sep. 7, 2020; 6 pages.

Rodriguez, Desiree; "Make nut milk and butter at home with the Nutramilk"; Rican Vegan website; https://www.ricanvegan.com/post/the-nutramilk-review; at least as early as Nov. 16, 2020; 3 pages.

Rodriguez, Desiree; "Rican Vegan: The Nutramilk Review—Making Nut Milk and Nut Butter at Home"; video transcript; YouTube website; https://www.youtube.com/watch?v=3xiemfl836g&feature=emb_logo; video posted Jun. 26, 2018; 2 pages.

Shoemaker, Caitlin; "Almond Cow vs. Blender: What's Best for Nut Milk?"; From My Bowl website; https://frommybowl.com/almond-cow-blender-review/; Oct. 15, 2019; 23 pages.

Shoemaker, Caitlin; "What Makes the BEST Nut Milk? | Almond Cow Review"; video transcript; YouTube website; https://www.youtube.com/watch?v=UKD9_GIF5QY; video posted Oct. 18, 2019; 4 pages.

Ultimate Handyman; "Ultimate Handyman: Linear actuator | Electric actuator"; video transcript; YouTube website; https://youtu.be/ErGBqVJS2jA; video posted Dec. 13, 2014; 1 page.

Various; "Mad Millie Hard Cheese Press Kit with Pressure Gauge"; collection of information and images from around the internet including www.amazon.com; Feb. 20, 2021; 3 pages.

Vervita; "ChufaMix"; product description; Ver Vita Ltd. website; https://vervita.com/products/price/chufamix; at least as early as Aug. 25, 2020; 7 pages.

Wikipedia; "Almond"; website; https://en.wikipedia.org/wiki/Almond; page last edited Aug. 26, 2020 as of Sep. 7, 2020; 18 pages.

Wikipedia; "Pressing (wine)"; website; https://en.wikipedia.org/wiki/Pressing_(wine); page last edited on Jul. 15, 2020 as of Feb. 20, 2021; 9 pages.

Williams Sonoma; "Kilner Nut Milk Maker Set"; Williams Sonoma website; https://www.williams-sonoma.com/products/kilner-nut-milk-maker-jar-set/; as of Aug. 12, 2020; 3 pages.

Wine Makers Corner; "Wine and Fruit Press—The 4 Best Options"; Wine Makers Corner website; winemakerscorner.com/wine-and-fruit-presses; Jul. 11, 2019; 8 pages.

\* cited by examiner

PLANT MIXTURE PROCESSING SYSTEMS

The present application is a continuation of U.S. patent application Ser. No. 17/330,387, filed May 25, 2021, now U.S. Pat. No. 11,382,448. U.S. patent application Ser. No. 17/330,387 is a continuation-in-part of U.S. patent application Ser. No. 17/238,198, filed Apr. 22, 2021. The present application is based on and claims priority from these applications, the disclosures of which are hereby expressly incorporated herein by reference in their entirety.

TECHNICAL FIELD

The present disclosure describes systems (including apparatuses and/or methods) that generally relate to the technical field of plant mixture processing, and specifically relate to the technical field of extracting "milk" from a plant mixture.

BACKGROUND

In the United States, store-bought nut and grain milks are a big industry valued at over two billion dollars. Almond milk, the most popular type of store-bought nut milk, constitutes a 64% share of the nut milk market. Other exemplary types of plant milk include, but are not limited to, other types of nut milk (e.g. milks made from cashews, hazelnuts, walnuts, macadamias, and pistachios), seed milks (e.g. milks made from coffee beans, flax, hemp, chia, and sunflower), grain milks (e.g. milks made from rice, oats, and *quinoa*), leaf milks (e.g. milks made from tea), legume milks (e.g. milks made from soybeans, peas, and peanuts), fruit milks (e.g. milks made from coconut and berries (such as blackberries and raspberries)), vegetable milks (e.g. milks made from tiger nuts, celery, beets, carrots, and tomatoes), and other fluid derived from plant-based materials. Plant-based milks may also be referred to as "non-dairy milks" or just "milks."

Frankly, store-bought milks are just not the same as fresh milks. For example, store-bought milks generally contain excessive water. They also most often contain additives such as vegetable oil, preservatives, and/or gum thickeners that can upset some stomachs and impart distinct aftertastes to the milks. Settling and separation are also problems seen with store-bought milks. By federal regulation, all alternative milks in containers are pasteurized by raising the temperature briefly to 280 degrees Fahrenheit (280° F.), which can reduce valuable natural vitamins. Because pasteurization can reduce the vitamin-content of the milks, it is often necessary to add nutrients to compensate for the reduction of natural vitamins, which may increase the cost. Pasteurization also cooks the milk and degrades the taste as compared to fresh milk. Store-bought organic milks may be chemical free, but sell at about double the cost of non-organic milks and may have other problems such as settling, separation, and the problems associated with pasteurization.

Fresh, homemade milks bear little resemblance to store-bought products. Fresh, homemade milks can be organic and are naturally more nutritious, cost-effective, and better tasting because they are fresh and do not contain oil, preservatives, and after-taste causing gum thickeners. Further, fresh, homemade milks are not subject to pasteurization, which can also alter the taste slightly.

Almonds are perhaps the most challenging nut to process into milk. In comparison, cashews, which are softer nuts, are easy to process into milk. It is difficult to grind almonds finely without soaking because the seed cover or peel is resistant to grinding. Soaking helps alleviate this problem, but takes about twelve (12) hours or more and can help catalyze a microbe bloom that reduces the shelf life of the resulting almond milk.

The process of making plant milk (such as almond milk) by hand can be time-consuming, messy, and expensive. For example, a common way to make almond milk uses a blender and a nut bag filter (also referred to as a "nut bag"). Almonds, water, and optional other ingredients are blended in a blender. The mixture is then poured into the nut bag. Pressure (hand squeezing and/or wringing) is applied to remove the milk from the pulp. Put another way, squeezing or wringing the full nut bag causes the milk to be expressed from the nut bag, but the pulp remains in the nut bag. Hand compression can be time-consuming because it always feels like there is liquid left for removal. The leftover pulp remaining in a nut bag is very messy. The quantity of leftover pulp may be excessive and add to the cost of the milk. Both the blender and the nut bag must be cleaned, but nut bags cannot go in a dishwasher. Cleaning the nut bag by hand is time-consuming. Common sense sanitation also requires that the nut bag be regularly replaced (which adds to the cost of the milk).

A chinois filter is a cone-shaped metal strainer with a fine mesh that is traditionally used for straining stocks, sauces, and soups. Using a chinois filter to strain plant milk is faster than using a nut bag. Still, because there is no effective way to compress the nut mixture, using the chinois sieve requires excessive time for the nut mixture to leak through. This time encourages microbe bloom that results in premature spoilage of the nut milk. The cone shape also makes full compression difficult, which means that not all the milk will be separated from the pulp. In addition, the results vary because of the inconsistencies of the mesh found on this type of filter. For example, a chinois filter can let bigger, unwanted grains of pulp through the mesh because of hole-size variance. The cleaning of the chinois filter can be time-consuming because the pores in the mesh attract and hold particles of the almond mixture which harden over time, making thorough cleaning difficult.

A French press for coffee and a tea diffuser are widely available consumer products. They are, however, not designed to handle a typical almond mixture and clog immediately upon use. They are too small for making approximately 0.95 liters (approximately 1.00 quart) and are not designed to hold up under the heavier pressure necessary to make plant milk.

There are many nut milk makers now manufactured for home-use. The existing almond nut milk makers have drawbacks. Unfortunately, all existing nut milk makers for home-use require an abundance of time to produce a few liters/quarts of almond milk not including excessive preparation and cleanup time. Many recommend soaking almonds for softening, which takes additional time. Conventional nut milk makers for home-use can have somewhat complex electronics, and blinking lights to show operation and requisite safety lock functions that can be awkward.

U.S. Pat. No. 10,349,771 to Andoni Monforte Duart (the "Duart reference") is directed to a device for beverage production. The Duart reference contains the description of a device for producing beverages that is compatible with any handheld domestic blender. The Duart device enables beverage production either by crushing a solid element (e.g. tiger nuts) from which the juice is extracted and at the same time filtering the same, or enabling mixing a solid element with a liquid one at the same time that it is being filtered. The Duart device includes at least one filtering beaker, a pestle for inserting into the filtering beaker, and structure for holding the filtering beaker.

U.S. Pat. No. 1,412,029 to Galdi et al. is directed to a wine press. This wine press and its modern day successors (e.g. traditional presses and bladder presses) operate on similar principles. Fruit and other ingredients (in some cases, pre-blended) are put into a cylindrical container (e.g. a mesh basket or slotted shell) and then downward pressure is applied. The pressure squeezes the mixture. While the pulp remains in the cylindrical container, juice exits the cylindrical container through the holes in the mesh basket or the slots in the shell. Gravity causes the juices to flow downward into a trough. The juices exit the trough (e.g. through a discharge spout) and flow into a collection container.

The following patents and publications provide examples of other types of methods, apparatuses, and systems for producing beverages from plant products:
- U.S. Pat. No. 5,656,321 to Berger et al. describes almond milk preparation process and products obtained;
- U.S. Pat. No. 10,334,986 to Gross et al. describes a method and device for making nut butter and nut milk;
- U.S. Patent Application Publication No. 2005/0199129 to Glucksman et al. describes an infusion beverage brewing system;
- U.S. Pat. No. 6,135,019 to Chou describes a filter assembly for a blender; and
- U.S. Pat. No. 7,430,957 and U.S. Patent Application Publication No. 2005/0068847 (both to Sands) describe a blender and juicer system.

SUMMARY

The present disclosure describes systems (including apparatuses and/or methods) that generally relate to the technical field of plant mixture processing, and specifically relate to the technical field of extracting "milk" from a plant mixture. Preferably the plant mixture processing system described herein processes plant mixture in a home setting into a high-quality, fresh, and/or best-tasting milk that does not include undesired additives (e.g. preservatives or gum thickeners) and/or has relatively little settling over time.

A processing system for processing plant mixture into milk and pulp preferably includes a filter, a plunger mechanism, and a pulp catcher.

The filter preferably includes a filter wall and a filter floor. The filter wall preferably has a filter wall rim. The filter wall preferably has filter holes defined therein. The filter floor preferably has filter holes defined therein. The filter wall and the filter floor preferably define a filter chamber.

The plunger mechanism preferably includes a plunger shaft, an actuator, and a plunger head. The plunger shaft preferably has an actuator end and a plunger head end. The actuator is preferably at the actuator end of the plunger shaft. The actuator preferably controls raising, lowering, and/or rotating movement of the plunger mechanism. The plunger head is preferably at the plunger head end of the plunger shaft. The plunger head is preferably insertable into the filter chamber. The plunger head preferably has an upper surface, a lower surface, and an outer annular surface. The lower surface preferably has a first part of a connector.

The pulp catcher preferably has a body and a second part of a connector. The body of the pulp catcher is preferably positioned in said filter chamber at least near the filter floor. The second part of the connector is interconnectable with the first part of the connector when the plunger head is lowered within the filter chamber.

In at least some preferred processing systems the filter holes are at least 50,000 photochemically etched filter holes.

In at least some preferred processing systems, lowering the plunger mechanism expresses milk through the filter holes. Preferably, lowering the plunger mechanism extracts the milk from the plant mixture.

At least some preferred processing systems further include a filter lid. The filter lid preferably has an upper lid surface with a lid wall. A centrally located stabilizing collar preferably extends through the upper lid surface. The plunger shaft is preferably slidably positioned through the stabilizing collar. The filter lid is preferably selectively associated with the filter wall rim.

In at least some preferred processing systems, the lower surface of the plunger head has at least one clearing blade. Each clearing blade preferably has at least one shaving edge. Preferably the at least one shaving edge clears pulp from the filter wall surrounding the filter chamber when the plunger mechanism is rotated.

In at least some preferred processing systems, at least one annular gasket surrounds the outer annular surface of the plunger head to form a gasketed plunger head. The filter chamber may be pressurized as the plunger head is lowered within the filter chamber.

At least some preferred processing systems further include a ring funnel. The ring funnel preferably has an upper funnel opening and a lower funnel opening. The filter is preferably positioned at least partially within the ring funnel with the filter floor between the upper funnel opening and the lower funnel opening. The ring funnel preferably directs milk exiting through the lower funnel opening into a container.

At least some preferred processing systems form the pulp into a pulp cake between the plunger head and the pulp catcher. This may happen when the first part of the connector interconnects with the second part of the connector. This may happen when at least the majority of milk has been expressed through the filter holes.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

DESCRIPTION OF THE DRAWINGS

The accompanying drawings illustrate various exemplary plant mixture processing systems, components of various exemplary plant mixture processing systems, and/or provide teachings by which the various exemplary plant mixture processing systems are more readily understood.

Figure 1:
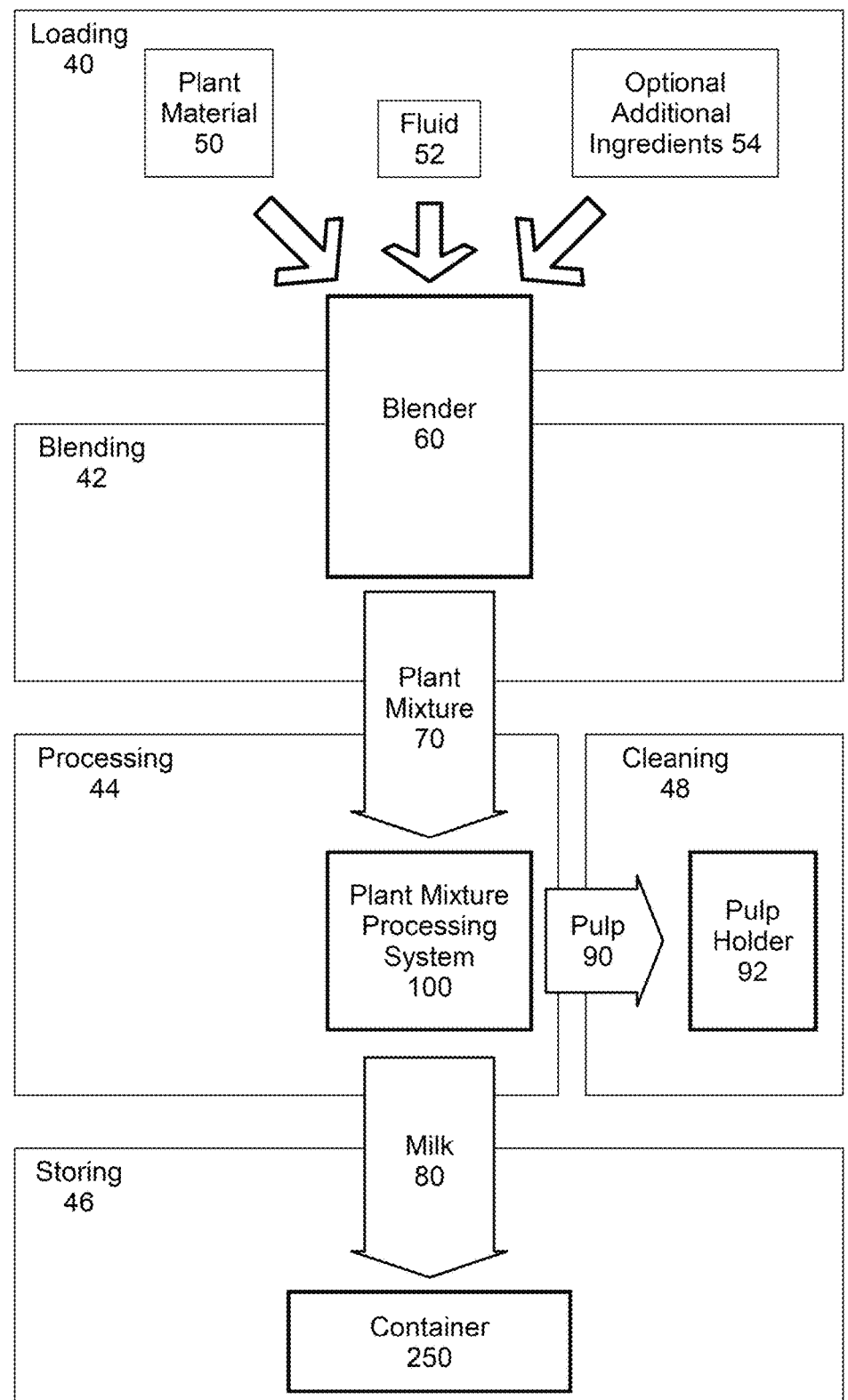
FIG. 1 is a flow diagram showing the steps and components used to obtain milk and pulp from ingredients by using a blender and a plant mixture processing system.
Figure 2:
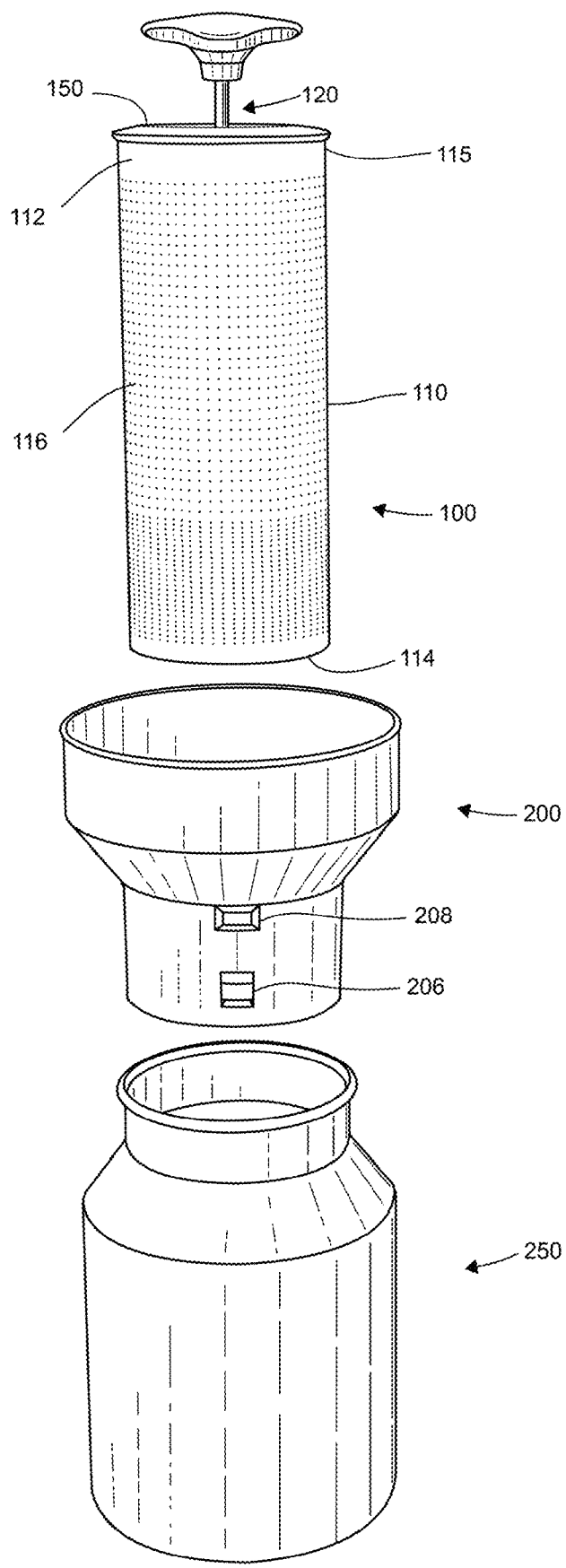
FIG. 2 is an exploded perspective view of a preferred exemplary plant mixture processing system.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION

As shown in FIG. 1, disclosed herein are steps and components used to separate milk 80 and pulp 90 from a plant mixture 70 (blended ingredients 50, 52, 54) by using a blender 60 and a plant mixture processing system 100 (also referred to as a "processing system 100"). Ingredients 50, 52, 54 are loaded in a loading step 40 into a blender 60 where they are blended in a blending step 42 to create a plant mixture 70. The plant mixture 70 is then transferred to the processing system 100 (which preferably includes a filter 110, a plunger mechanism 120 (having at least one clearing blade 140 (although clearing blade 140 is shown and described throughout this document, it could be replaced with the alternate clearing blade 140' (FIG. 14)), and a pulp catcher 170). The processing system 100 then processes the plant mixture 70 in a processing step 44 (which includes extracting) to separate milk 80 from pulp 90. The processing step 44 preferably has a homogenizing-like effect that prevents separation. (Traditional homogenization is usually associated with fats or oils. If fat or oil were present in the plant mixture, then there would be a homogenization-like effect. If fat or oil were not present in the plant mixture, then, technically, there would not be a homogenization-like effect, but the plant mixture could still be processed by the processing system 100.) The milk 80 may be stored in a storing step 46 in a container 250. The pulp 90 may be removed (cleaned) in a cleaning step 48 from the processing system 100 and held in a pulp holder 92. At a high level of abstraction, therefore, preferred processing systems 100 described herein process milk 80 from a blended plant mixture 70.

Figure 21:
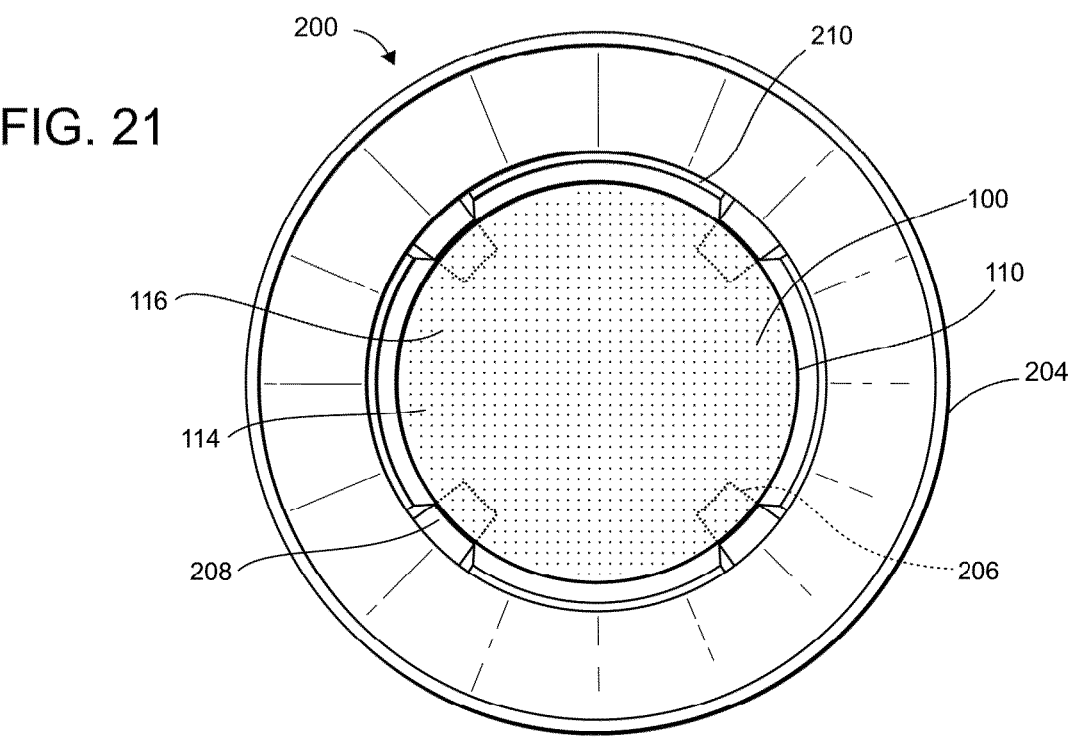
FIG. 21 is a top view of an exemplary filter positioned within the exemplary ring funnel of FIG. 20.

As disclosed herein and as shown in FIGS. 1-9 (with additional details shown in FIGS. 10-21), an exemplary plant mixture processing system 100 preferably includes a filter 110, a plunger mechanism 120 (having at least one clearing blade 140), and a pulp catcher 170. The processing systems 100 also preferably include or use a ring funnel 200. The processing systems 100 may also use components such as a blender 60 and a container 250. As shown, the ring funnel 200 is preferably positioned so as to direct milk 80 exiting the filter 110 into the container 250. The filter 110 has a filter wall 112 (FIG. 2) and a filter floor 114 (FIG. 21), both of which have filter holes 116 therein. The plunger mechanism 120 (FIGS. 4-7) preferably has a plunger shaft 122 with an actuator 124 (shown as a rotatable knob) at an actuator end and a plunger head 130 (the lower surface of which preferably has at least one clearing blade 140 and a first part of a connector 160 at a plunger head end. A filter lid 150 designed to fit in the filter wall rim 115 (the top of the filter 110) may be centered on the shaft 122. The filter lid 150 is shown as movably (e.g. slideably (FIGS. 4-6)) positioned on the plunger shaft 122 between the actuator 124 and the plunger head 130. A pulp catcher 170 (having an associated second part of a connector 162 (e.g. a ball stem)) is positioned within the filter 110 on the floor 114.

Figure 4:
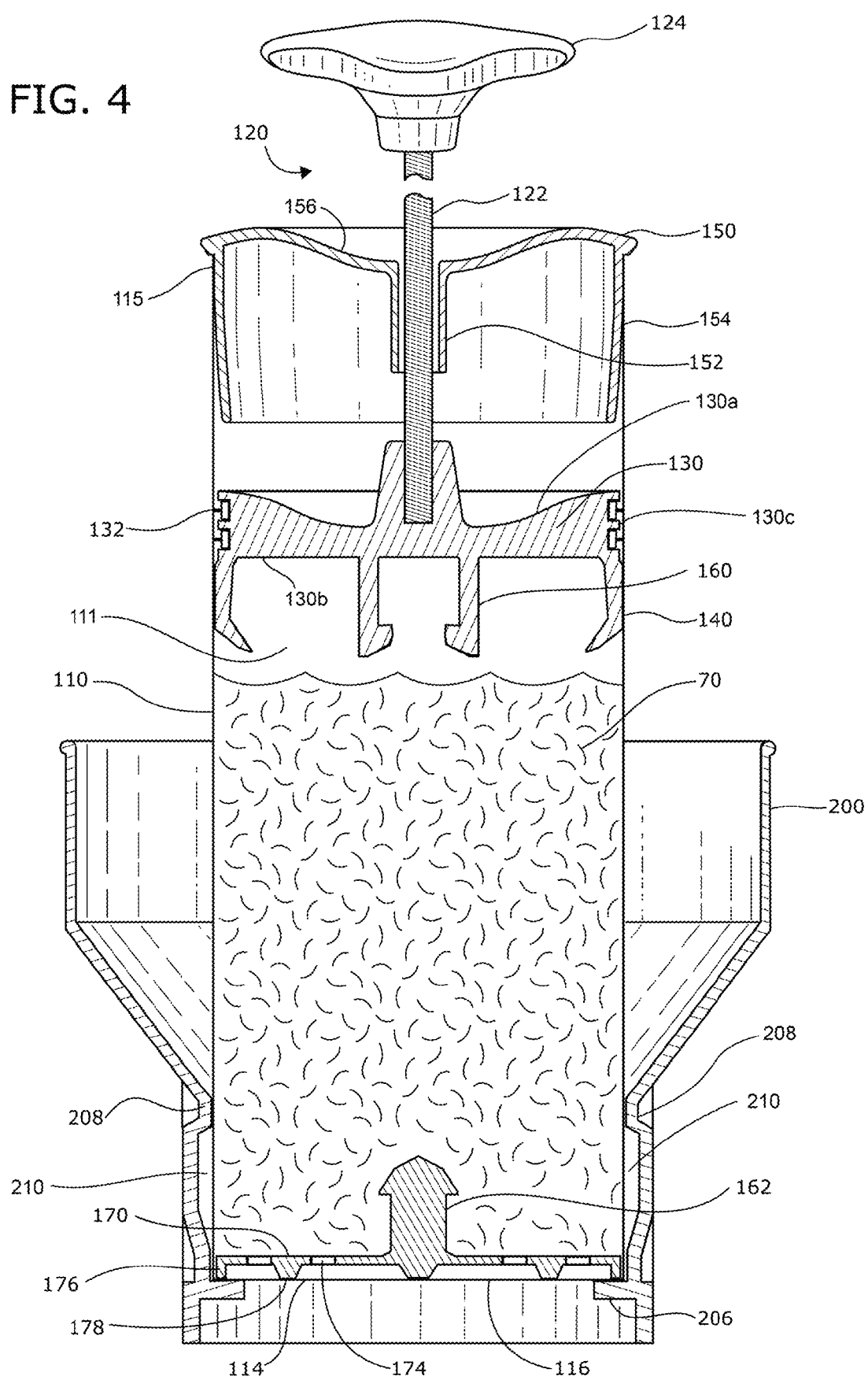
FIG. 4 is a cross-sectional view of an exemplary filter positioned at least partially within an exemplary ring funnel, the ring funnel positioned at least substantially above an exemplary container (not shown), and an exemplary plunger mechanism in a raised position prior to compression of plant mixture.
Figure 5:
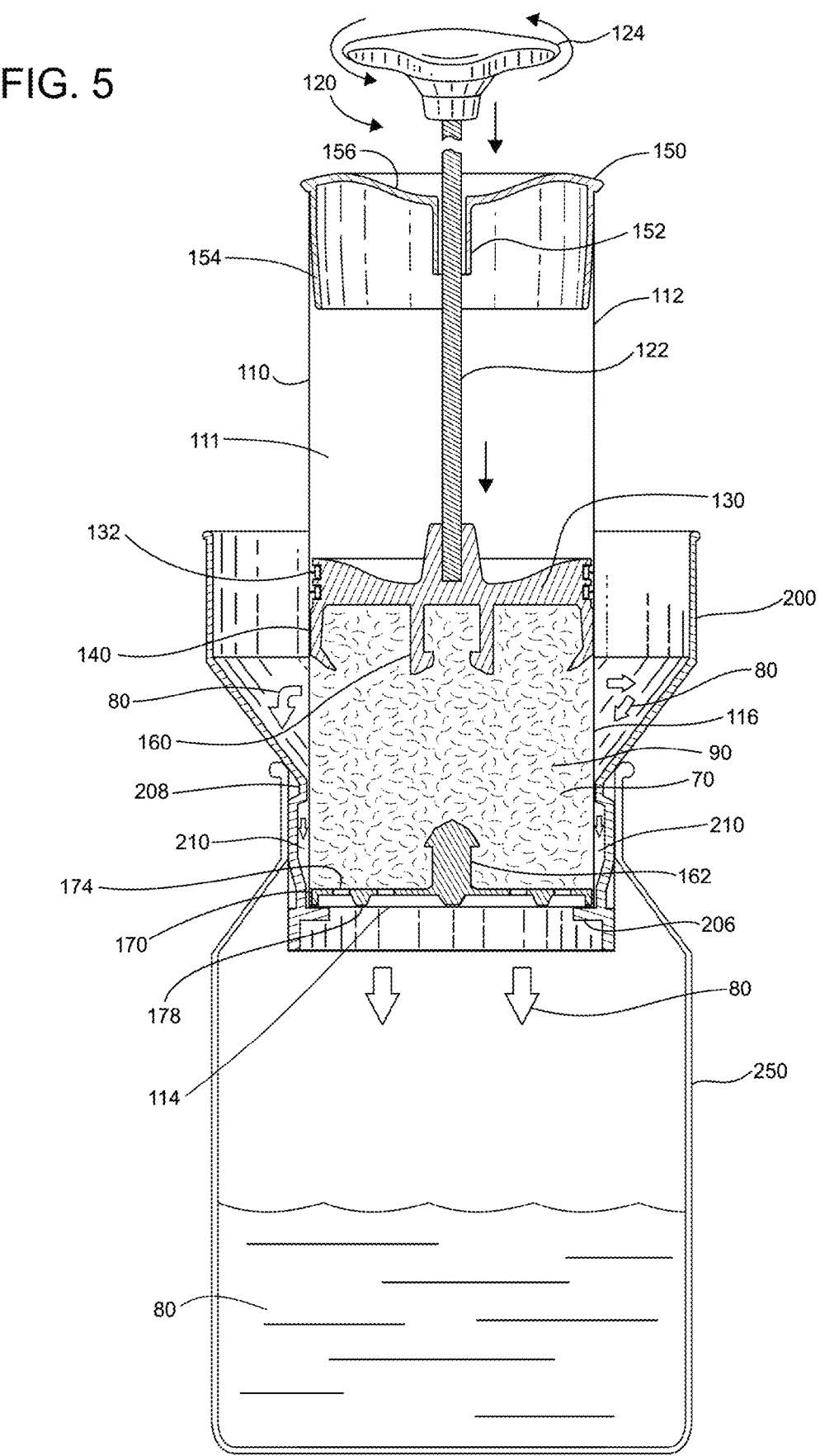
FIG. 5 is a cross-sectional view of the filter positioned at least partially within the ring funnel, the ring funnel positioned at least substantially above the container, and the plunger mechanism partway through compression of the plant mixture.
Figure 6:
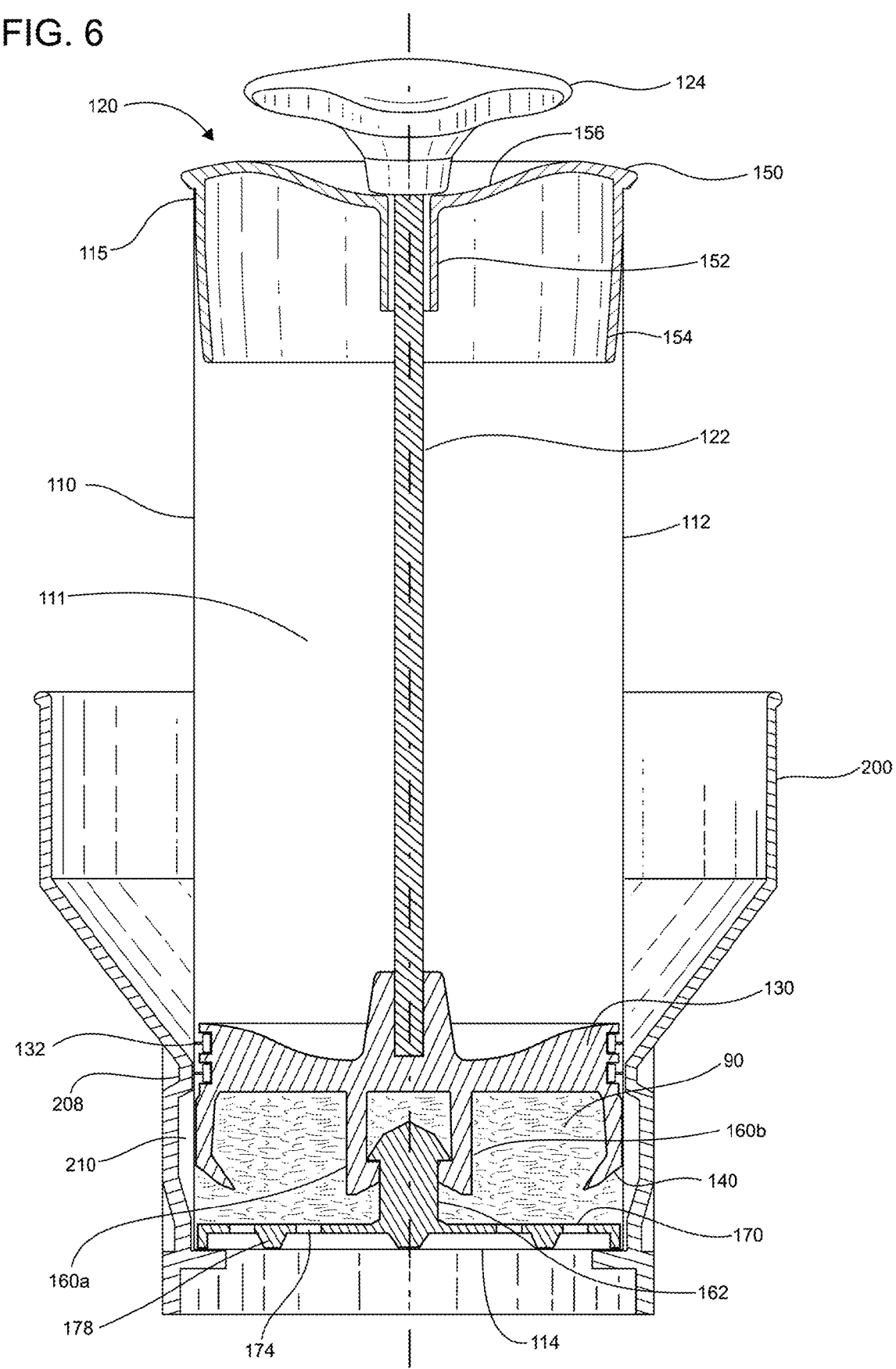
FIG. 6 is a cross-sectional view of the filter positioned at least partially within the ring funnel, the ring funnel positioned at least substantially above the container (not shown), the plunger mechanism in a lowered position after compression of the plant mixture, and the plunger mechanism in a locked relationship with an exemplary pulp catcher.
Figure 7:
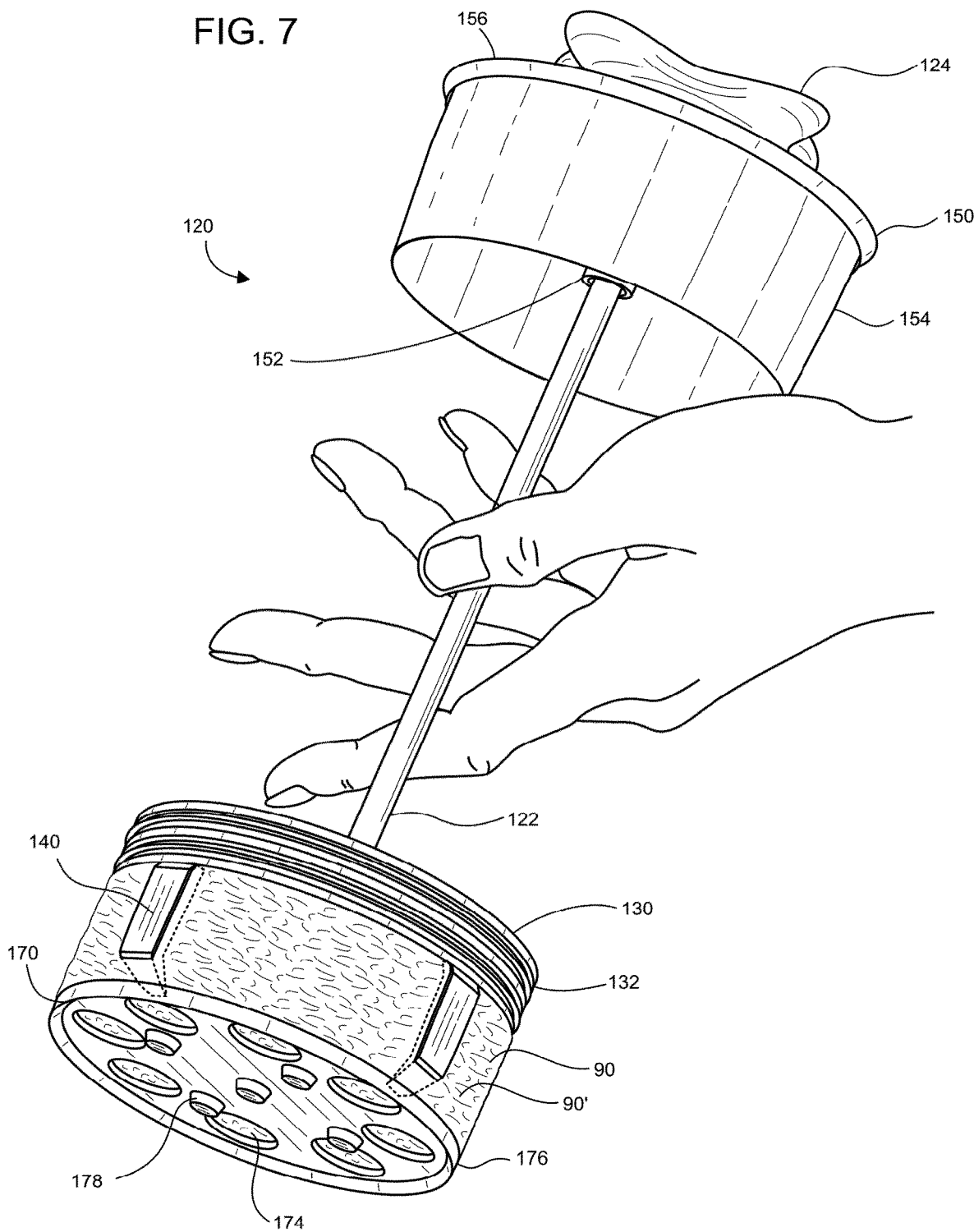
FIG. 7 is a perspective view of the plunger mechanism in a locked relationship with the pulp catcher, the plunger mechanism and pulp catcher removed from the filter, and pulp retained between a lower surface of an exemplary plunger head and an upper surface of the pulp catcher.
Figure 8:
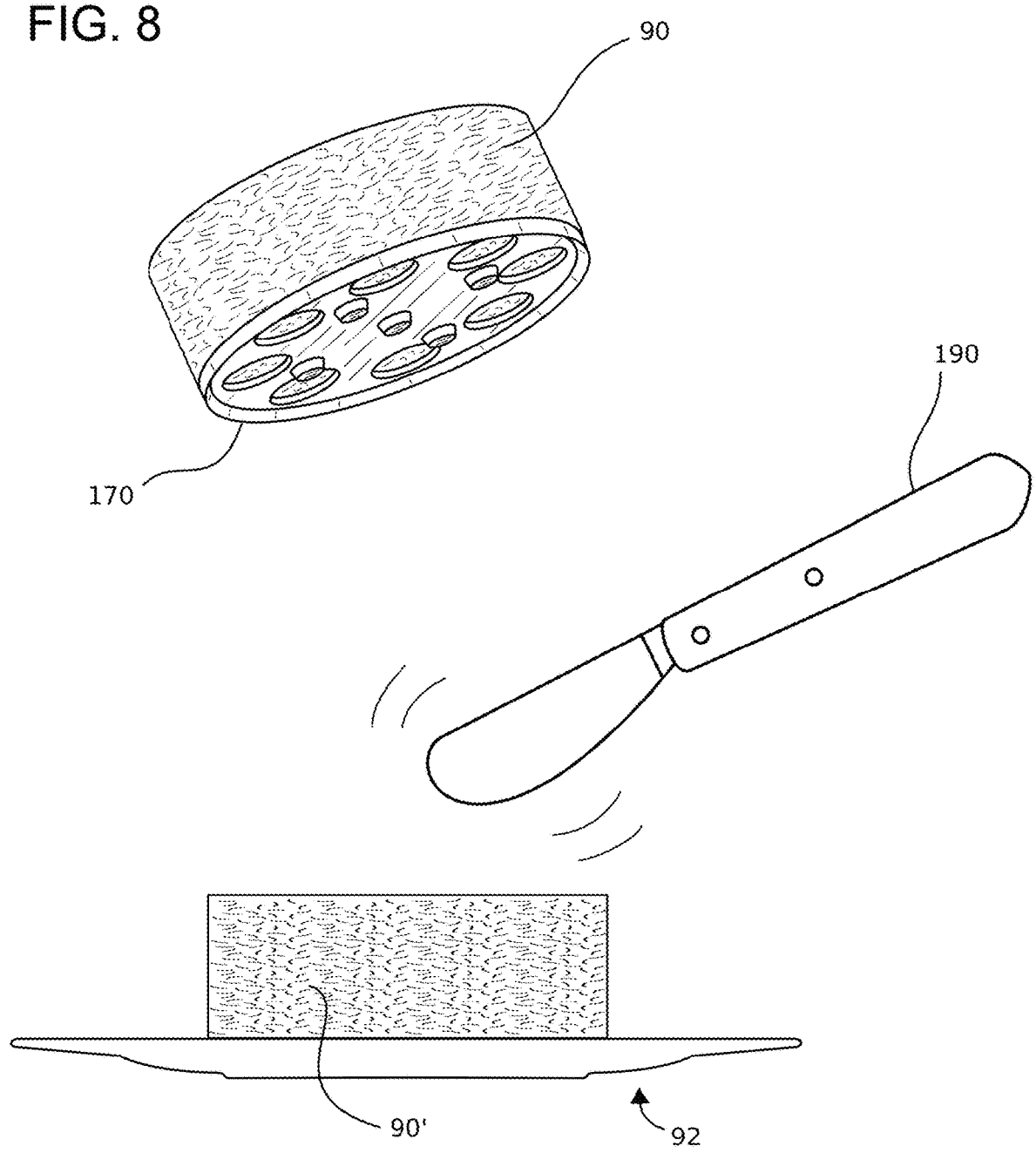
FIG. 8 is a perspective view showing the removal of the pulp from the pulp catcher using a knife.

FIGS. 4-8 show an example of the plant mixture processing system 100 during the processing step 44, the container 250 receiving milk 80 in the storing step 46, and the pulp 90 being removed (cleaned) in the cleaning step 48 from the processing system 100 and held in a pulp holder 92. More specifically, FIG. 4 shows the exemplary plunger mechanism 120 in a raised position prior to compression of the plant mixture 70. FIG. 5 shows the exemplary plunger mechanism 120 partway through compression of the plant mixture 70 with milk flowing from filter holes 116 in the filter wall 112 (directed by the ring funnel 200) and filter holes 116 in the filter floor 114 into the container 250. FIG. 6 shows the exemplary plunger mechanism 120 in a lowered position after compression of the plant mixture 70, and the exemplary plunger mechanism 120 in a secured relationship with an exemplary pulp catcher 170 (the first part of the connector 160 being interconnected with (latched to) the second part of the connector 162). FIG. 7 shows the removed plunger mechanism 120 with pulp 90 retained between the lower surface of the exemplary plunger head 130 and the upper surface of the pulp catcher 170. FIG. 8 shows the removal of the pulp 90 by being removed (e.g. using a remover such as a knife 190) from the pulp catcher 170 and onto a pulp holder 92 (shown as a plate).

Preferred processing systems 100 may have at least one of the following advantages over known prior art systems:

Preferred processing systems 100 preferably produce a product (e.g. milk 80) that has a better taste than the product produced by prior art.

Preferred processing systems 100 preferably produce a product (e.g. milk 80) that has a better texture (e.g. smooth with little or no graininess) than the product produced by prior art.

Preferred processing systems 100 preferably produce a product (e.g. milk 80) that has a better consistency and viscosity (not too thick and not too thin) than the product produced by prior art. (Preferably, the ingredients 50, 52, 54 can be varied for thicker or thinner milk by adjusting, for example, the specific ingredients or the ingredient ratios.)

Preferred processing systems 100 preferably produce a product (e.g. milk 80) that has less separation than the product produced by prior art and, therefore, may allow for resulting milk 80 to have a longer period that it is considered "fresh."

Preferred processing systems 100 preferably can be used to salvage valuable pulp 90 that has been condensed into a pulp cake 90' because it can be used, for example, in baking, in cosmetics, or as animal feed.

Preferred processing systems 100 preferably produce a more consistent product (e.g. milk 80 or mole (which can be thought of as a specific type of milk)) than prior art in that, once a recipe has been determined that produces a desired product, following that same recipe produces similar products.

Preferred processing systems 100 are preferably more efficient than prior art.

Preferred processing systems 100 are preferably faster than prior art.

Preferred processing systems 100 are preferably easier to clean than prior art. Reasons for this easy cleanability may include, for example, the lack of cumbersome parts, the absence of electronics (for manual models), and/or the use of dishwasher safe components.

Preferred processing systems 100 are preferably versatile in that they can be used (or adapted or customized to be used) for a multitude of processing needs. For example, processing systems 100 described herein may be used to process many types of plant materials to make many types of products (e.g. milks, butters, jams, and jellies). For jams and jellies, for example, a fruit mixture may be processed using the processing system prior to adding some of the ingredients (e.g. sugar and pectin) and cooking.

Preferred processing systems 100 are preferably pressurized.

Preferred processing systems 100 preferably require only a manual plunger mechanism 120 to create pressure to force the plant mixture 70 through the filter 110. Although some processing systems 100' may be automated, manual processing systems 100 do not require motors or electricity.

Preferred processing systems 100 may be compact for easy storage (e.g. approximately 20.32 cm (approximately 8.00 inches) in diameter and approximately 29.21 cm (approximately 11.50 inches) in height). The relatively small size also allows components to be placed in a dishwasher.

Preferred processing systems 100 preferably have a simple construction.

Preferred processing systems 100 are preferably constructed from relatively lightweight and durable materials (e.g. food grade sterilizable metals and/or plastics).

Preferred processing systems 100 preferably are easy to operate and/or the methods of operation are intuitive. This makes production of the milk 80 relatively easy.

Further preferred objects and advantages of our invention will become apparent from a consideration of the drawings and ensuing description.

Exemplary processing systems 100 may be better understood with reference to the drawings, but these processing systems 100 are not intended to be of a limiting nature. The same reference numbers will be used throughout the drawings and description in this document to refer to the same or like parts. Some reference numbers (e.g. reference numbers ending with a prime symbol (') or double prime symbol (")) refer to specific variations that could be substituted for the variations shown in other figures. Unless otherwise specified, all the variations may be referred to jointly by the general reference number (without the prime or double prime). The shown shapes and relative dimensions are preferred, but are not meant to be limiting unless specifically claimed, in which case they may limit the scope of that particular claim.

Before describing the plant mixture processing systems 100 and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide basic parameters for interpreting terms and phrases used herein.

The phrase "plant mixture processing systems" (also referred to as "processing systems") is meant to include apparatuses ("plant mixture processors," "plant mixture processing devices," "plant mixture milkers," and/or "plant mixture milking devices") and/or methods ("plant mixture processing," "plant mixture processing methods," "plant mixture milking," and/or "plant mixture milking methods") for processing milk 80 from a plant mixture 70. The phrase "processing" may also be referred to as "extracting," "milking," and/or "producing a homogenization-like effect."

The term "milk" and the phrases "non-dairy milk" and "plant-based milk" are meant to describe the substance obtained after a plant mixture 70 has been processed using the processing systems 100. Other types of milk (e.g. milk from animals such as cows or goats) will be specifically designated as such.

The terms "processing" and "milking" are meant to describe extracting milk 80 from a plant mixture 70 using the processing systems 100. Preferably, milk 80 that has been "processed" or "milked" from plant mixture 70 using the processing systems 100 described herein do not separate as quickly as milk 80 obtained using other systems. Accordingly, the processing step 44 may have a homogenization-like effect on the produced milk 80.

The term "plant" and phrase "plant material" are meant to include "milkable" plants, portions of plants, and/or plant components including, but not limited to, nuts (e.g. almonds, cashews, hazelnuts, walnuts, macadamias, and pistachios), seeds (e.g. coffee beans, flax, hemp, chia, and sunflower), grains (rice, oats, and *quinoa*), leaves (e.g. tea), legumes (e.g. soybeans, peas, and peanuts), fruit (e.g. coconut and berries (such as blackberries and raspberries)), vegetables (e.g. tiger nuts, celery, beets, carrots, and tomatoes). Almonds are used as an exemplary plant material throughout this document.

The phrases "plant mixture" (or a specific type of mixture such as "almond mixture") and "blended plant mixture" are meant to mean the post-blending, but pre-processing (pre-milking) of a mixture of ingredients including plant material 50, fluid 52 (e.g. water), and optional additional ingredients 54 (e.g. sweeteners). (Before blending, the different ingredients may be referred to generally and jointly as "ingredients.") Put another way, the plant mixture 70 has already been blended, but has not been "milked." Because the plant mixture 70 has not yet been milked, it still includes pulp 90. For example, in its simplest form, plant mixture 70 includes blended ingredients such as plant material 50 and fluid 52. An exemplary almond milk recipe uses an approximately 4:1 ratio of water (e.g. 0.84 liters (3.50 cups) to almonds (e.g. 0.18 liters (0.75 cups)), which may be used with a 2.89 liter (approximately 2.00 quart or 64.00 ounce) blender 60 without causing leaking due to overfill during the blending process). This recipe can be varied to obtain different quantities, milk texture, and viscosity. For example, reducing the amount of water will result in a thicker, cream-like almond cream for coffee. Using ingredients for mole (which can be thought of as a specific type of milk) produces a completely different product. Different plant materials 50 and/or different types of products (e.g. milk 80) may require different ratios and/or recipes.

The term "extracting" (and variations thereof) includes the process of expressing fluids from a plant mixture 70 through a filter.

The phrase "homogenization-like effect" (and variations thereof) can be understood in comparison to the traditional homogenization of cow milk. In non-homogenized cow milk, milk fat particles (fat droplets) rise to the surface to create a layer of cream. In homogenized cow milk, fat droplets (milk fat globules) are emulsified (reduced to small particles and distributed uniformly through the rest of the fluid) using a high-pressure procedure (e.g. forcing milk at a high pressure (e.g. 20,000+ psi) through small holes). The traditional homogenizing process results in the small particles of milk fat being suspended in the remaining fluid to create a more uniform product. In addition, the homogenized cow milk resists dividing into its component parts (which is also known as separating or settling). The processing step 44 performed by the processing systems 100 (and possibly the blending step 42) preferably has a homogenization-like effect on milks 80 derived from plant mixtures 70. One theory about how this homogenization-like effect is produced is the pressure (e.g. 10.0 psi) applied by the plunger mechanism 120 to the plant mixture 70 within the filter 110. Other theories include the use of the powerful blender 60, the size of the filter holes 116, or the adjustment of temperature. The homogenization-like effect could be due to any one of or a combination of some or all of these factors. Experimental use has shown that while almond milk produced by known competitors' "milkers" or "melkers" show signs of division (separating or settling) within 24 hours. In comparison, the almond milk produced by the processing system 100 described herein didn't begin to show signs of division (separating or settling) for at least 24 hours.

The term "associated" is defined to mean integral or original, retrofitted, attached, connected (including functionally connected), positioned near, and/or accessible by. For example, a pulp catcher 170 positioned within the filter 110 on the filter floor 114 may be considered to be "associated" with the filter floor 114 even though it is not "attached" to the filter floor 114. Another example is the ring funnel "associated" with the container is shown as a removable and replaceable ring funnel that may be associated with the mouth of the container. However, the ring funnel may also be, for example, built into the container or attached to the container via a conduit (e.g. a hose).

It should be noted that the dimensions and capacities disclosed herein may be adapted and scaled. For example, although the shown filter 110 is designed to process approximately 0.95 liters (approximately 1.00 quart), it can be scaled to process different volumes by adjusting the dimensions and the quantities of holes 116. Another example is that the shown container 250 holds approximately 2.89 liters (approximately 2.00 quarts) of milk, but it could be modified to hold more or less milk (e.g. approximately 0.95 to 3.79 liters (approximately 1.00 to 4.00 quarts)).

It should be noted that relative terms are meant to help in the understanding of the technology and are not meant to limit the scope of the invention. Similarly, unless specifically stated otherwise, the terms "first" and "second" are meant solely for purposes of designation and not for order or limitation. For example, the "first part of the connector 160" has no order relationship with the "second part of the connector 162."

It should be noted that some terms used in this specification are meant to be relative. For example, the term "top" is meant to be relative to the term "bottom." The term "front" is meant to be relative to the term "back," and the term "side" is meant to describe a "face" or "view" that connects the "front" and the "back." Rotation of the system or component that would change the designation might change the terminology, but not the concept.

Terms such as "preferred" (and variations thereof (including preferably)), "may," "might," "can," and "could" are used to indicate alternatives and optional features and only should be construed as a limitation if specifically included in the claims. For example, the phrase "filter holes 116 are preferably concentrated in the lower portion of the wall 112 and/or in the floor 114" indicates that this concentration is optional and the holes could be, for example, evenly distributed on the wall and floor. It should be noted that the various components, features, steps, and/or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type. For example, an "exemplary blender being a VITAMIX® blender" is just one example of a blender, but other blenders could be just as desirable.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof).

It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

Components

The plant mixture processing systems 100 described herein preferably include components such as a filter 110, a plunger mechanism 120 (that includes at least one clearing blade 140), and a pulp catcher 170. The processing systems 100 also preferably include or use a ring funnel 200. The processing systems 100 may also use components such as a blender 60, a container 250, and a remover 190 (e.g. knife). Some of the components (e.g. the blender 60, the container 250, and the remover 190) are components that consumers may own or purchase for other purposes and, therefore, could be sold separately from components such as the filter 110, the pulp catcher 170, and the plunger mechanism 120. Put another way, some components may be replaced with alternative similarly functional components (e.g. the container 250 could be a container owned by the user rather than the specifically provided container). On the other hand, an appliance company could sell components (e.g. the filter 110, the pulp catcher 170, and the plunger mechanism 120) in combination with their blenders 60. The processing systems 100 are preferably made from suitable food grade materials (e.g. stainless steel or suitable plastic materials).

Blender

An exemplary blender 60 preferably has a capacity of approximately 2.89 liters (approximately 2.00 quarts). An exemplary blender 60 preferably operates at 2 hp and 20,000 RPM. Such a high-powered blender has sufficient power to grind and pulverize plant material 50 (including almonds) and simultaneously blend it with fluid 52 and optional additional ingredients 54.

One exemplary blender 60 is the VITAMIX® blender manufactured by Vita-Mix Corporation. U.S. Pat. No. 3,368,800 to Barnard and U.S. Pat. No. 9,084,512 to Boozer provide background on some of the VITAMIX® blenders. Philips and Breville corporations have also introduced equally high-powered blenders.

Technically, any blender 60 may be used to blend ingredients 50, 52, 54 into a plant mixture 70. High-powered blenders, however, tend to produce better milk 80. Low-powered blenders tend to produce milk similar to skim milk or store-bought almond milk.

Filter

The filter 110 has a peripheral or annular filter wall 112 (FIG. 2 and FIG. 13) and a filter floor 114 (FIG. 2 and FIG. 21), both of which have filter holes 116 therein. The peripheral or annular filter wall 112 and filter floor 114 define a filter chamber 111. The top of the filter wall 112 is the filter wall rim 115. The filter holes 116 are preferably concentrated in the lower portion of the wall 112 and/or in the floor 114. Put another way, there may be more filter holes 116 per square centimeter (square inch) in the lower portion of the wall 112 and/or in the floor 114 than there are in the upper portion of the wall 112.

The filter 110 is preferably cylindrical and defines an interior filter chamber 111 that may receive the plant mixture 70. An associable filter lid 150 may be provided that mates with the filter wall rim 115 of the filter 110 (the upper edge of the filter wall 112). The filter 110 (in conjunction with other components) is used to process plant mixture 70 into milk 80 and pulp 90.

An exemplary filter 110 is able to process 0.95 liters (approximately 1.00 quart) of milk 80. Such an exemplary filter 110 has a diameter of approximately 7.62 cm (approximately 3.00 inches) and a height of approximately 25.40 cm (approximately 10.00 inches). The wall 112 and floor 114 of this exemplary filter 110 preferably have about 80,000 to 100,000 filter holes 116 with a diameter of approximately 0.35 mm (approximately 13.78 mils). Prototype filters and microscopic photography were used to estimate the filter hole 116 size needed for the filter 110 and it was assumed that approximately 10% of the almond mixture particles will have difficultly passing through the filter holes 116 by particle size documentation.

The filter 110 can be customized for accommodating different desired products (e.g. thicker or thinner milk 80), different plant material 50 or other ingredients (e.g. nuts, grains, fruits, teas/coffee), different quantities (e.g. processing more milk 80) and many different applications (e.g. milks, sauces, jams, jellies). These customizations may include changes to the shape, size, quantity, and/or distribution of the filter holes (e.g. fewer larger holes or additional smaller holes). The filter hole size may be determined based on the particle size (produced by the blender 60 in a predetermined grind time (e.g. two minutes)) desired to be produced for a particular recipe.

The customizations may also include modifications to the dimensions (e.g. diameter and/or height) of the filter 110. For example, the filter can be scaled to have a greater capacity (e.g. approximately 2.89 liters (approximately 2.00 quarts)) by increasing the diameter to approximately 15.24 cm (approximately 6.00 inches) (keeping the height of approximately 25.40 cm (approximately 10.00 inches)). The wall and floor of such a doubled-capacity filter may preferably have an increased number of filter holes (e.g. about 160,000 to 200,000 filter holes). Another example of a filter that is scaled to an even greater capacity (e.g. 4.79 liters (approximately 4.00 quarts)) has a diameter of approximately 30.48 cm (approximately 12.00 inches) (keeping the height of approximately 25.40 cm (approximately 10.00 inches)). The wall and floor of this quadrupled-capacity filter may preferably have an increased number of filter holes (e.g. about 320,000 to 400,000 filter holes).

The filter 110 may be a stainless steel filter that has a smooth interior surface. The filter 110 may be fabricated and/or manufactured by processes that facilitate the clean, smooth, and accurate production of the filter wall 112 and the filter floor 114 with filter holes 116 therein. An exemplary process that would be suitable is photochemical etching. Photochemical etching has advantages including producing a smooth, easy to clean surface and consistently accurate filter holes 116.

Plunger Mechanism

The plunger mechanism 120 (in combination with at least the filter 110 and the pulp catcher 170) is engineered to separate and condense a predetermined amount of pulp 90 from a plant mixture 70 and retain the pulp 90 (as a pulp cake 90') for later removal.

Figure 12:
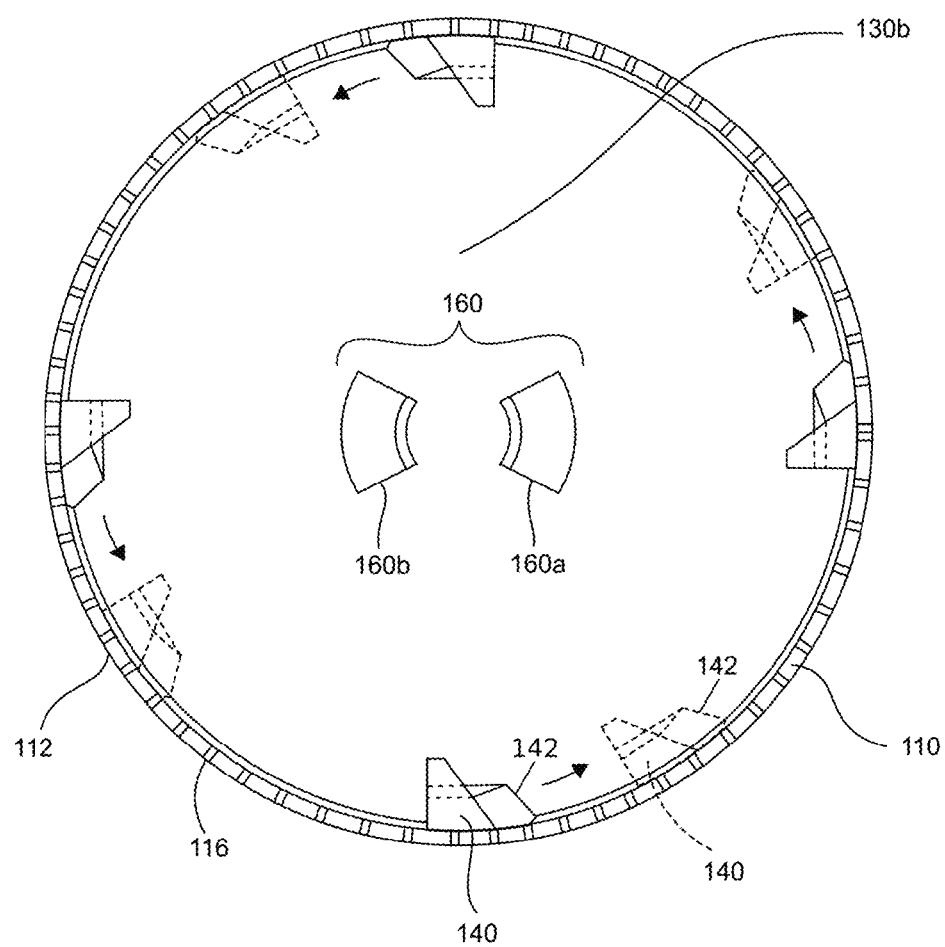
FIG. 12 is a bottom view of an exemplary plunger head having four clearing blades extending from its lower surface, the clearing blades also shown in phantom to represent a slight rotation.
Figure 13:
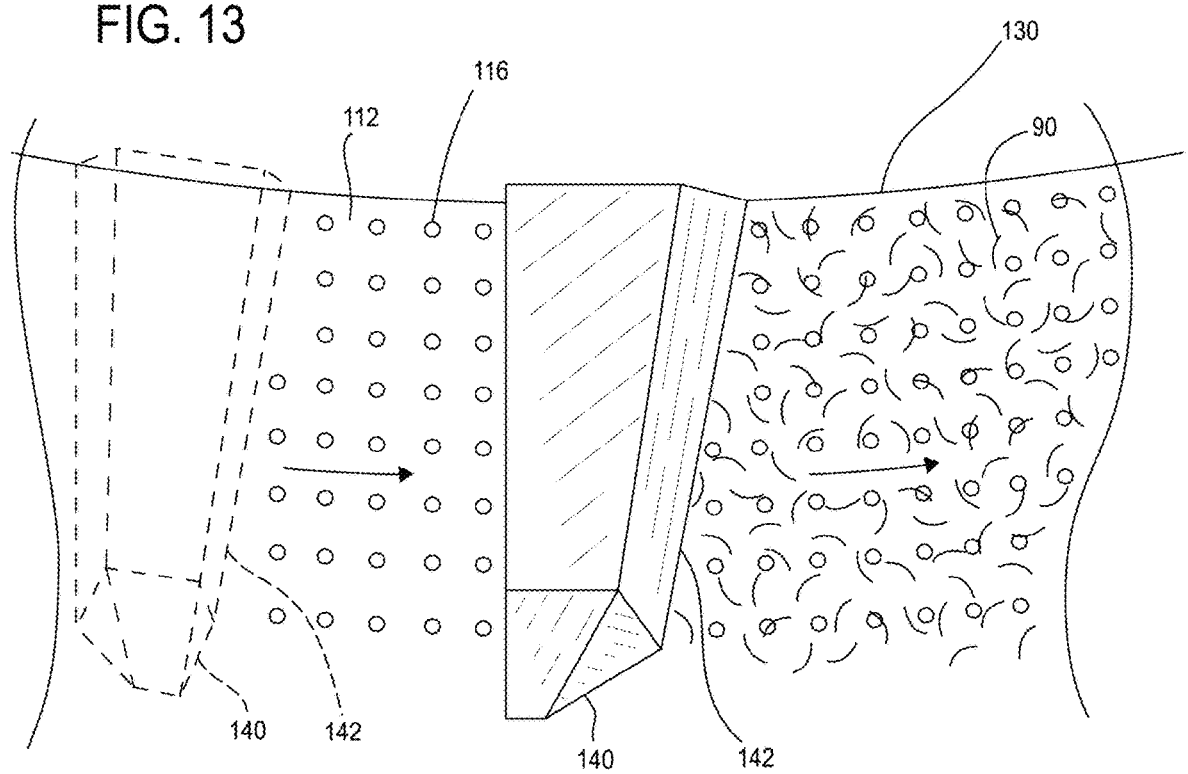
FIG. 13 is a perspective view of an exemplary clearing blade having a straight edge in the process of clearing pulp from the filter holes.
Figure 14:
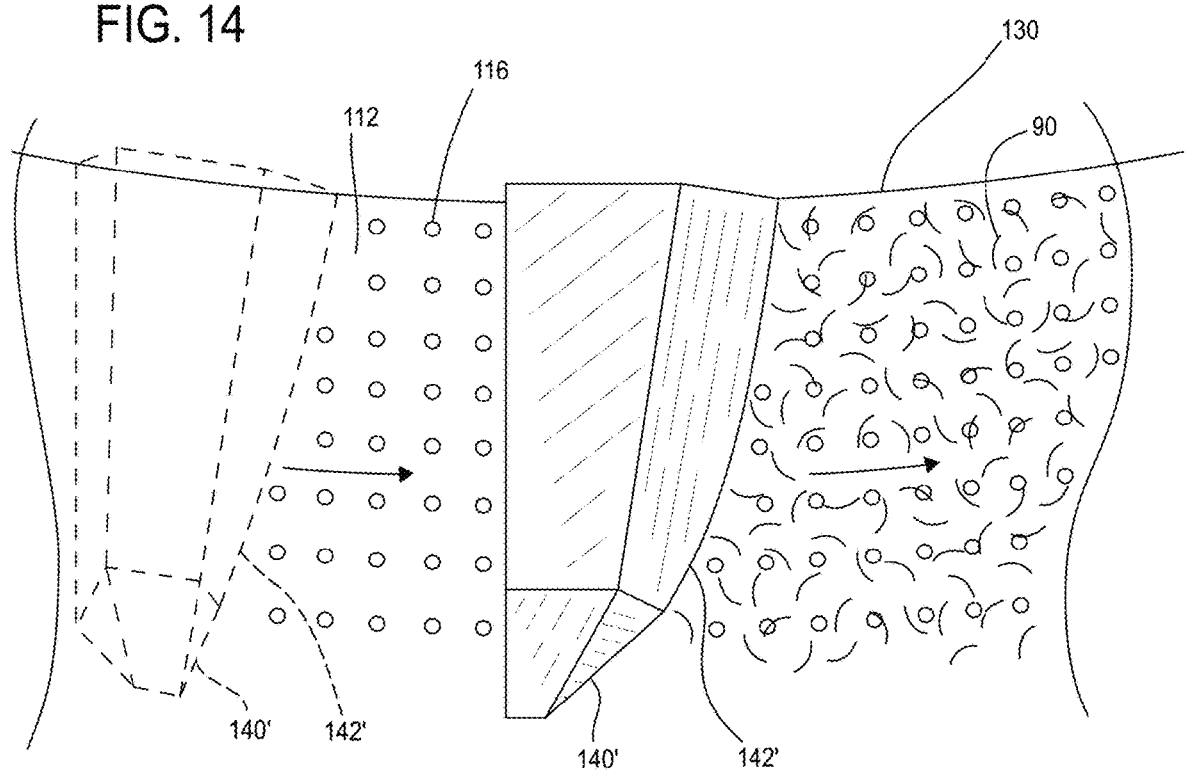
FIG. 14 is a perspective view of an exemplary clearing blade having a curved edge in the process of clearing pulp from the filter holes.
Figure 15:
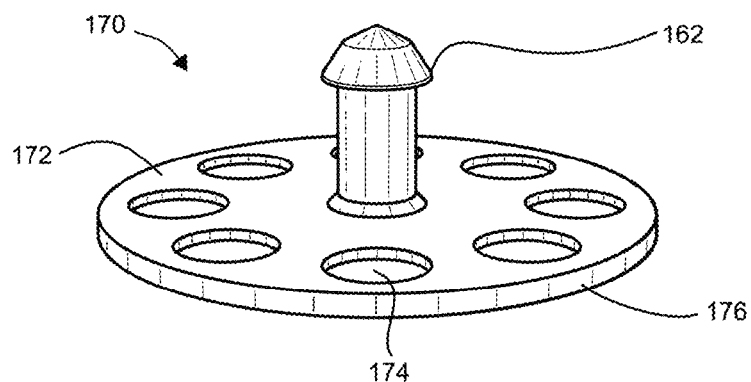
FIG. 15 is a perspective view of an exemplary pulp catcher.
Figure 16:
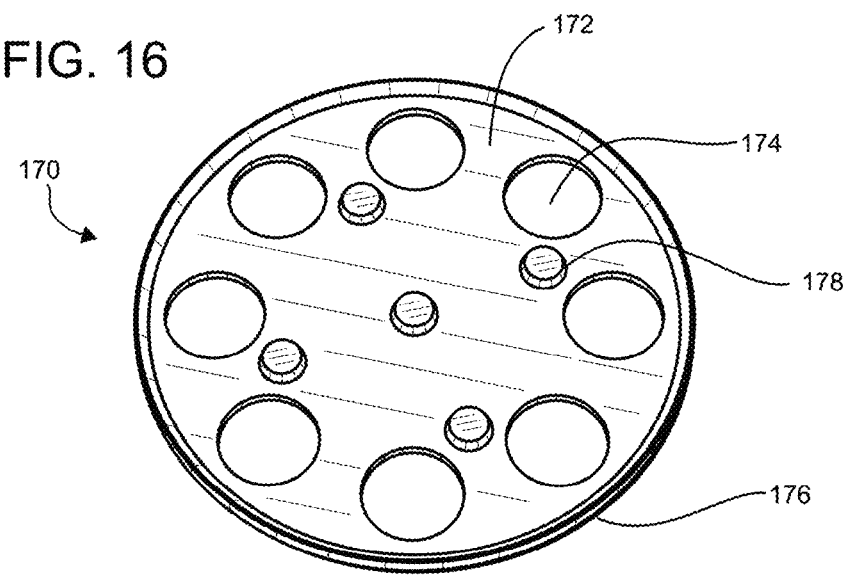
FIG. 16 is a bottom plan view of the exemplary pulp catcher of FIG. 15.

As set forth, the plunger mechanism 120 (FIGS. 4-7) preferably has a plunger shaft 122 with an actuator 124 at an actuator end and a plunger head 130 at a plunger head end distal from the actuator end. A filter lid 150 is movably positioned between the actuator 124 and the plunger head 130. The plunger mechanism 120 is designed to be associated (e.g. inserted into) with the filter 110. The actuator 124 can be used to raise the plunger head 130 (FIG. 4), lower the plunger head 130 (FIGS. 5-6), and/or rotate the plunger head 130 (FIGS. 12-14).

As shown, the filter lid 150 is designed to mate with the peripheral or annular filter wall rim 115 (mouth) of the filter 110. For example, if the filter 110 is cylindrical (circular in cross-section), the filter lid 150 would be at least substantially circular in cross-section. Centrally located within the circumference of the filter lid 150 there is an opening that is shown as a stabilizing elongated collar 152 (shown as a tube with a smooth inner diameter in FIGS. 4-6) through which the plunger shaft 122 is preferably slidably positioned. As shown, a lid wall 154 preferably projects substantially downward from the rim of the upper lid surface 156 of the filter lid 150. The lid wall 154 may be tapered inwardly for easier insertion into the filter 110.

The filter lid 150 is preferably movably (e.g. slidably or screwably) positioned between the actuator 124 and the plunger head 130. The plunger mechanism 120 is associable with the filter 110 such that the filter lid 150 mates with the top of the filter 110 (the filter wall rim 115), the plunger head 130 is positioned within the filter 110 (below the filter lid 150), and the actuator 124 is positioned outside the filter 110 (above the filter lid 150). The stabilizing elongated collar 152 of the filter lid 150 preferably centers the plunger shaft 122 (and thus the plunger mechanism 120) so that the shaft's movements are essentially along the longitudinal axis of the filter 110. Put another way, the plunger mechanism 120 is positioned such that the filter lid 150, when mated with the mouth of the filter 110, centers the plunger shaft 122.

The plunger shaft 122 is shown as an elongated cylinder having a smooth outer diameter. As mentioned, the plunger shaft 122 is preferably positioned through a stabilizing elongated collar 152 (shown as a tube with a smooth inner diameter) that is centrally located in the filter lid 150. The plunger shaft 122 is preferably able to move up/down and rotatably within the stabilizing elongated collar 152. In the case of a smooth plunger shaft 122, the up/down and rotating movements are unrestricted and smooth. (An alternative plunger shaft could have a threaded outer diameter, if it was used in conjunction with an interior-threaded stabilizing elongated collar. If the plunger shaft is threaded (e.g. plunger shaft 122' in FIG. 22), the up/down and rotating movements are restricted (orderly) as it moves along the threading. In such a case, the filter lid 150 would have a securing mechanism to prevent the filter lid 150 from rising.

The actuator 124 is associated with an actuator end of the plunger shaft 122. The actuator 124 can be used to control the raising/lowering of the plunger mechanism 120 and the rotation of the plunger mechanism 120. Put another way, the actuator 124 can be used to raise the plunger head 130 (FIG. 4), lower the plunger head 130 (FIGS. 5-6), and/or rotate the plunger head 130 (FIG. 12-14). When the actuator 124 is raised/lowered, the rising/lowering movement is transferred through the shaft 122 to raise/lower the plunger head 130 (and its at least substantially downward-projecting first part of a connector 160) within the filter chamber 111 until the first part of a connector 160 latches to the second part of a connector 162. When the actuator 124 is turned/rotated, the rotating movement is transferred through the shaft 122 to rotate the plunger head 130 (and its downward-projecting clearing blade(s) 140) within the filter chamber 111 to clear pulp particles from the annular filter wall 112. An example of a combination movement is when the actuator 124 is both turned and lowered, the rotating/lowering movement is transferred through the shaft 122 to the plunger head 130 such that the downward-projecting clearing blades 140 rotate as the plunger head 130 descends.

Figure 11:
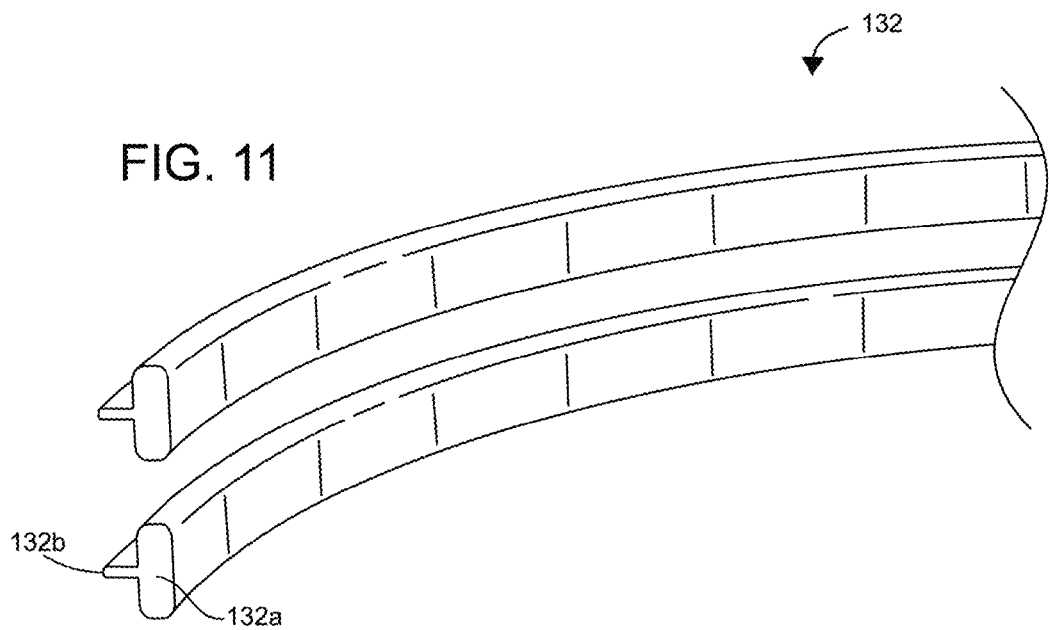
FIG. 11 is a perspective view of two exemplary gaskets having a T-shaped cross-section.

The actuator 124 is shown as a knob having a plurality (shown as four) of lobes that allow a user to grip and turn the actuator 124. As shown in FIG. 11, if a processing system 100 has four evenly spaced clearing blades 140, turning the actuator 124 a quarter turn (90 degrees) would clear (e.g. by using the clearing blades 140 to shave (which includes scraping, cutting, and/or wiping) the inner surface of the filter chamber 111 (the filter wall 112 of the filter 110)) the full interior circumference (360 degrees) of the filter 110 below the plunger head 130. If fewer clearing blades were used, the user would have to turn the actuator 124 farther to clear the full interior circumference of the filter 110 below the plunger head 130. If there were a single clearing blade, for example, a full (360 degrees) rotation would be necessary to clear the full interior circumference of the filter 110 below the plunger head 130. If more clearing blades were used, the user would not have to turn the actuator 124 as far to clear the full interior circumference of the filter 110 below the plunger head 130. As shown in FIGS. 13 and 14, as the clearing blades 140, 140' rotate, they clear the filter holes 116 of the filter 110 below the plunger head 130 such that the milk 80 can pass therethrough. Depending on the orientation and shaving edge(s) 142 of the clearing blades 140, the rotation of the actuator/head/blades could be clockwise, counterclockwise, and/or in both directions. The location (right/left) and quantity (one/two) of the shaving edge(s) 142 would depend on the direction of the rotation. For example, if the rotation were in both clockwise and counterclockwise directions, both edges of the clearing blades 140 would be shaving edge(s) 142. Although shown as a knob, the actuator 124 could be an alternative type of actuator such as a lever mechanism (similar to the handle of a manual coffee grinder).

The plunger head 130 is shown in FIGS. 4-7 and in detail in FIGS. 10-14. The plunger head 130 has an upper surface 130*a*, a lower surface 130*b*, and an outer annular surface 130*c*. As shown, the plunger head end of the plunger shaft 122 is associated with the center of the upper surface of the plunger head 130. As also shown, the lower surface of the plunger head 130 preferably has an associated at least one clearing blade 140 (shown in FIG. 11 as four clearing blades 140) along its perimeter and the first part of a centrally located connector 160. Finally, the outer annular surface of the lower surface of the plunger head 130 preferably has at least one annular gasket 132 associated therewith. As will be discussed, the gasketed plunger head 130 pressurizes the plant mixture in the filter chamber 111 of the filter 110 in a manner similar to that by which the plunger piston pressurizes contents of the barrel of a syringe.

Each flexible clearing blade 140 (which includes alternative clearing blades 140' with a curved edge 142') is designed to clear the filter holes 116 of built-up pulp 90 by shaving off larger pulp particles and keeping the pulp particles within the filter 110 and wiping or clearing the filter holes 116 to allow additional expression of the milk 80 as the pulp 90 is compressed. Put another way, the clearing blades 140 unblock or unclog the filter holes 116 that have been clogged by pulp 90 to facilitate or allow the passage of milk 80 through the filter holes 116. When the actuator 124 is turned, the plunger head 130 rotates and the clearing blades 140 are conveyed at least partially around the inner annular surface of the filter 110 (FIG. 11). As they are being conveyed, the clearing blades 140 preferably press against the inner surface of the filter 110 effectively shaving (which includes scraping, cutting, and/or wiping) the inner surface of the filter 110 to remove excess pulp 90 from the filter holes 116. FIGS. 13-14 graphically show exemplary clearing blades 140, 140' with a clearing blade shaving edge(s) 142, 142' being used to clear the pulp 90 from the interior surface of the filter 110. As shown, the area (between the dashed line clearing blade 140 and the solid line clearing blade 140) that the clearing blade 140 has passed is shown as being free from pulp 90, whereas the area (to the right of the solid line clearing blade 140) that the clearing blade 140 has not yet passed is shown as having pulp 90 thereon.

The shown clearing blades 140 are meant to be exemplary in that there could be variations to the design. The following are preferred characteristics of exemplary clearing blades 140:

- The clearing blade shaving edge 142, together with the cutting or slicing movement of the clearing blades 140, clears the filter holes 116 of built-up pulp 90 to allow milk 80 to pass therethrough.
- Each clearing blades 140 has two edges, at least one of which is preferably a shaving edge(s) 142 (for shaving, scraping, cutting, and/or wiping the pulp 90 from the interior surface of plunger head 130 the filter 110). The shaving edge 142 is preferably sufficiently sharp to shave, scrape, cut, and/or wipe the pulp 90 from the interior surface of the filter 110, but preferably not so sharp as to be dangerous.
- The shown shaving edge 142 is shown as angled (as opposed to the other shown clearing blade edge that is shown as vertical). Having the shaving edge 142 be angled may make the shaving more effective. The "vertical" clearing blade edge would be parallel to the longitudinal axis of the filter 110 when the plunger mechanism 120 is positioned within the filter 110. When the plunger mechanism 120 is positioned within the filter 110, the clearing blades 140 (specifically the outer diameter of the clearing blade 140, including the angled shaving edge 142) are flush (and preferably even have some outward pressure) with the inner diameter of the filter 110. As mentioned, if the rotation were in both clockwise and counterclockwise directions, both edges of the clearing blades 140 would be shaving edge(s) 142 that would be at an angle to the longitudinal axis of the filter 110.
- In most figures, the shaving edges are shown as straight (e.g. shaving edge 142 in FIG. 13), but they could be curved (e.g. shaving edge 142' in FIG. 14).
- The clearing blades 140 may be positioned so that, before being inserted into the filter 110, at least part of the respective outer surfaces (e.g. the shaving edge(s) 142) are beyond the circumference of the inner diameter of the filter 110. If there are four evenly spaced clearing blades 140, the distance (before being inserted into the filter 110) between at least part of the outer surfaces (e.g. the shaving edge(s) 142) of opposed pairs clearing blades 140 is just slightly greater than the diameter of the inner surface of the filter 110. When the plunger head 130 is inserted into the filter 110, the clearing blades 140 (which are at least slightly flexible) compress inward, but push outward (attempting to return to their pre-compressed state) so that the at least part of the outer surfaces (e.g. the shaving edge(s) 142) press against the interior surface of the annular filter wall 112. When rotated, the outward pressure helps with the shaving, scraping, cutting, and/or wiping that clears the pulp 90 from the filter holes 116.
- The clearing blades 140 may have an at least substantially inward angle or bend in them such that the tip of each clearing blade 140 angles inward. This causes the tips to be within the circumference of the inner diameter of the filter 110. The tips may then be easily inserted into the mouth of the filter 110 and guide the plunger head 130 into the filter 110. The positioning of the tips, as well as the angle or bend, therefore, facilitates easier insertion of the clearing blades 140 and plunger head 130 into the filter 110.
- The clearing blades 140 preferably are elongate. The clearing blades 140 may be approximately the same length as the parts of the connectors 160, 162. (The first part of the connector 160, the second part of the connector 162, and the clearing blades 140 may have a length of between 1.27 cm (approximately 0.50 inches) and 3.18 cm (approximately 1.50 inches). These dimensions may be adjusted based on factors including, but not limited to, the dimensions of other components, the intended recipe, the desired amount of pulp, the desired "wetness" of the pulp, and the material from which the components are constructed.)

In addition to the peripherally located clearing blades 140, the lower surface of the plunger head 130 preferably includes an associated, centrally located first part of a connector 160 (e.g. a socket latch and/or flexible catch) that automatically interconnects with (latches to) the second part of a connector 162 (e.g. a ball stem) associated with the pulp catcher 170. The exemplary first part of the connector 160 is shown as having a plurality of inwardly angled or hooked connector segments 160a, 160b (see FIGS. 6 and 11). Although shown as two connector segments 160a, 160b, an alternative first part of the connector could have more connector segments (e.g. there are three connector segments 160' shown in FIG. 22). Further, another alternative first part of the connector could have a single connector segment (e.g. a tube). The plurality of connector segments 160a, 160b are preferably made of a semi-rigid material that bends and then returns to its original shape. The plurality of connector segments 160a, 160b are preferably shaped (angled or hooked) and spaced such that the opening formed therebetween is smaller than the enlarged upper part (ball) of the second part of the connector 162. When the plunger head 130 and first part of the connector 160 are lowered onto the second part of the connector 162 (the engagement point), the upper part (ball) of the second part of the connector 162 forces the plurality of connector segments 160a, 160b apart. Once past the enlarged upper part (ball) of the second part of the connector 162, the plurality of connector segments 160a, 160b at least substantially return to their original shape (although they may be held slightly apart by the lower part (stem) of the second part of the connector 162) trapping the enlarged upper part (ball) of the second part of the connector 162 therebetween. This effectively interconnects (latches) the first part of the connector 160 to the second part of the connector 162. The first part of the connector 160 will be discussed again along with the second part of the connector 162 herein.

The plunger head 130 (shown in detail in FIG. 9) preferably has at least one gasket 132 (shown in detail in FIG. 10) along its outer perimeter for compressing the plant mixture 70 in the filter 110. The gasketed plunger head 130 pressurizes the plant mixture in the filter 110 in a manner similar to how the plunger piston pressurizes contents of the barrel of a syringe. The gaskets 132 may also help stabilize the plunger head 130.

The shown exemplary gasketed plunger head 130 has at least one annular groove 134. Each annular groove 134 is designed to mate with a respective gasket 132. The annular grooves 134 hold the gaskets 132 in position. This configuration also allows the gaskets 132 to be removable and/or replaceable. Having removable and/or replaceable gaskets 132 would allow a new gasket to be used if the original was worn or if a different type of gasket was preferable for a particular application. Alternatively, the gaskets could be at least essentially permanent (difficult or impossible to remove without causing damage to the plunger head 130).

The shown gasketed plunger head 130 has two gaskets 132. Alternatively, one or more additional gaskets could be added. In addition, an alternative gasketed plunger head could have a single gasket.

Figure 10:
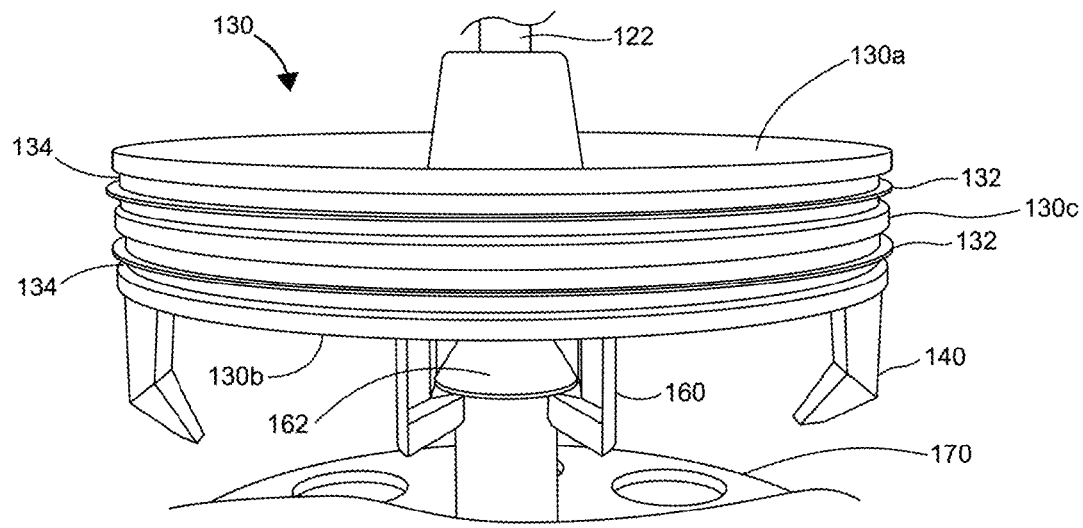
FIG. 10 is a perspective view of an exemplary double-gasketed plunger head in a locked relationship with an exemplary pulp catcher, the double-gasketed plunger head having two clearing blades extending from its lower surface.

As shown in FIGS. 10 and 11, gaskets 132 may be flexible annular T-shaped sealing gaskets that are T-shaped in cross-section. The top of the "T" 132a forms the inner diameter of a gasket 132 and fits tightly within and around the annular grooves 134. The perpendicular support leg of the "T" 132b annularly protrudes or extends beyond outer diameter of the plunger head 130. This protruding support leg of the "T" 132b mates with or drags along the inner annular wall of the filter 110 as the plunger head 130 descends within the filter 110. Put another way, the gasket(s) 132 function as a squeegee by controlling the flow of the fluid by pushing the fluid down ahead of the gasket(s) 132 and preventing fluid from upward past the gasket(s) 132. The protruding support leg of the "T" 132b acts as a seal or barrier preventing plant mixture 70 from escaping past the gasketed plunger head 130. Because the plant mixture 70 cannot get past the gasketed plunger head 130, the gasketed plunger head 130 pushes (applies pressure to) the plant mixture 70. With nowhere else to escape to, the plant mixture 70 is forced through the filter holes 116 in the wall 112 or the floor 114 of the filter 110.

The plunger head 130, connector segments 160a, 160b, and clearing blades 140 may be made from semi-rigid plastic (e.g. polypropylene or polyethylene). The at least one gasket 132 may be made from a softer and more flexible material such as silicone or rubber.

Pulp Catcher

Figure 9:
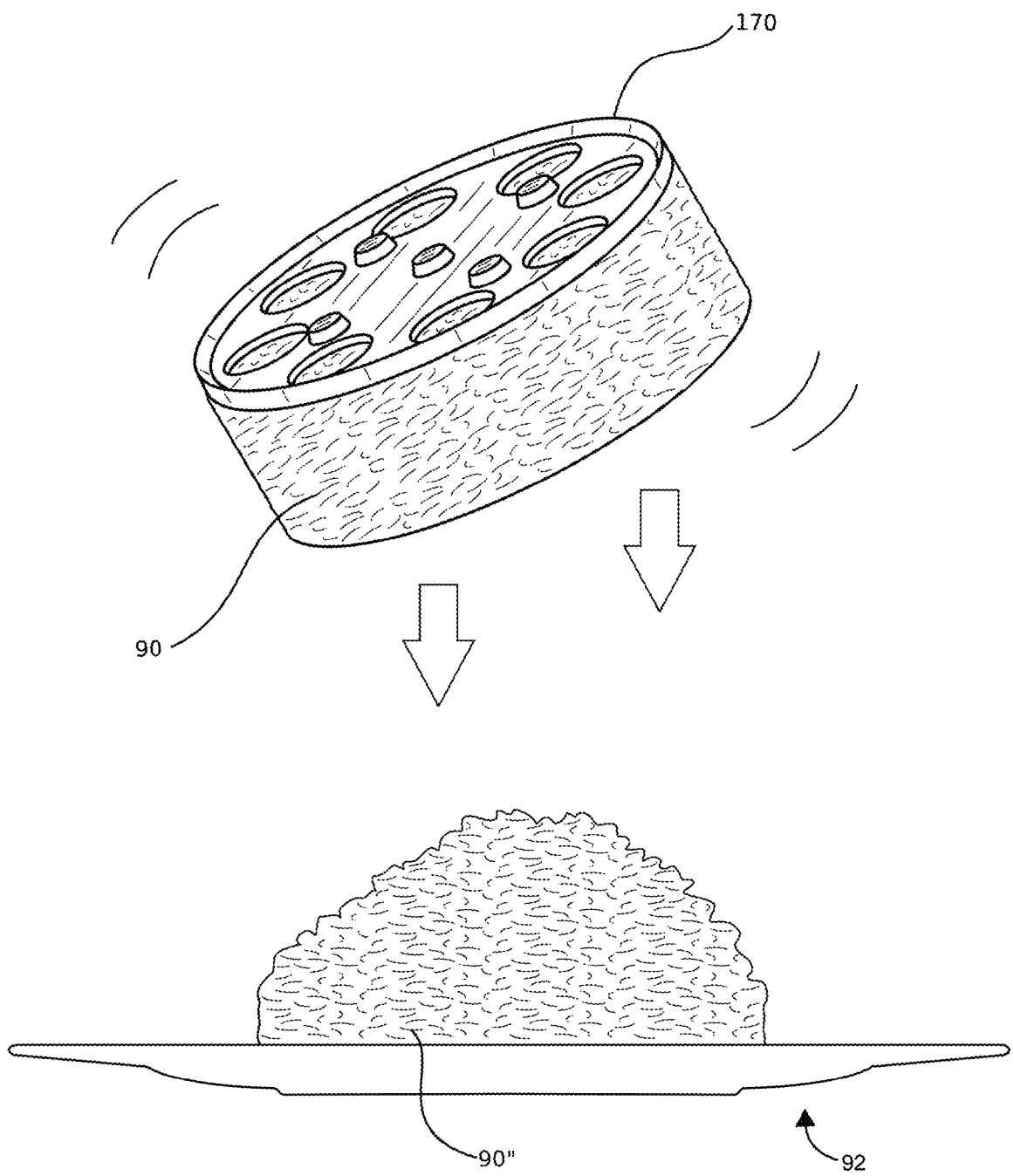
FIG. 9 is a perspective view showing the removal of the pulp from the pulp catcher using a shake or tap method.

Preferred processing systems 100 are able to condense valuable pulp 90 into an easily useable form that can be frozen, dried, used in baking, cosmetics, or as animal feed. Plant pulp 90 (e.g. almond pulp) is a resource rich in vitamins, protein, and fiber. The processing systems 100 are preferably engineered to simultaneously express the milk 80 while separately compressing the pulp 90 into a cake-like form (FIG. 8 shows an exemplary pulp cake 90' that maintains it form, and FIG. 9 shows an exemplary pulp cake 90" that crumbles) when the plunger head 130 reaches a predetermined bottom (interconnecting the first part of the connector 160 associated with the plunger head 130 with the second part of the connector 162 associated with a pulp catcher 170) based on a recipe (known ingredients) with measured amounts (known quantities) that have been blended for a predetermined grind time.

Figure 17:
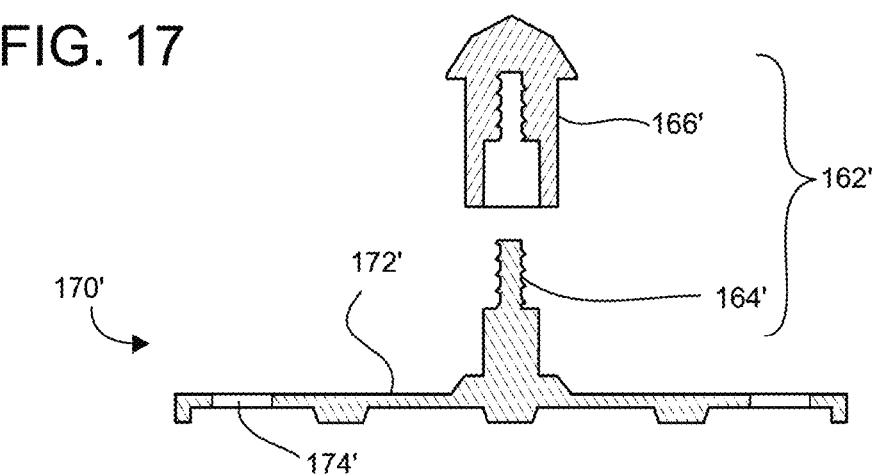
FIG. 17 is a cross-sectional exploded view of an adjustable pulp catcher showing a female "ball" spaced from a male "stem" (together referred to as a ball stem).
Figure 18:
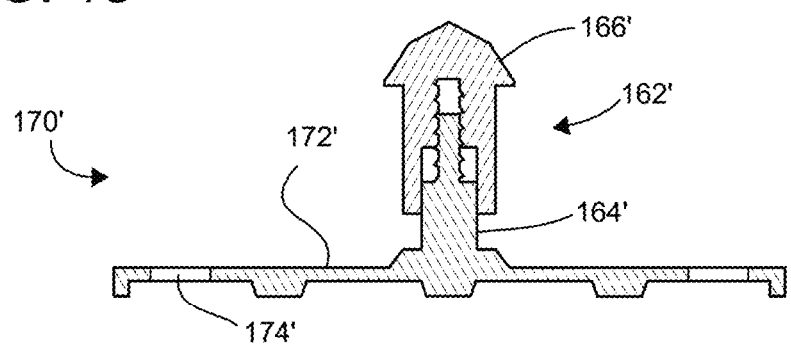
FIG. 18 is a cross-sectional view of the adjustable pulp catcher of FIG. 17 with the ball stem in an elevated configuration.
Figure 19:
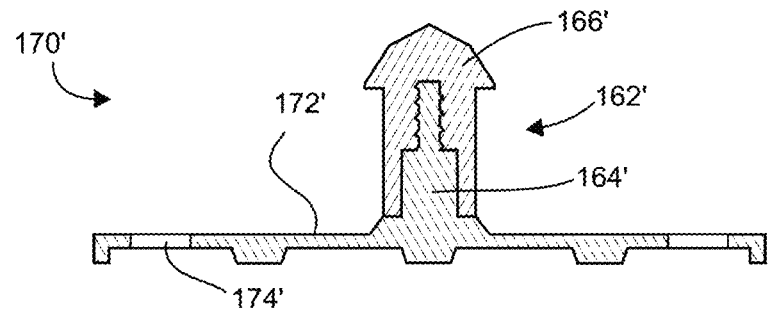
FIG. 19 is a cross-sectional view of the adjustable pulp catcher of FIG. 17 with the ball stem in a lowered configuration.
Figure 20:
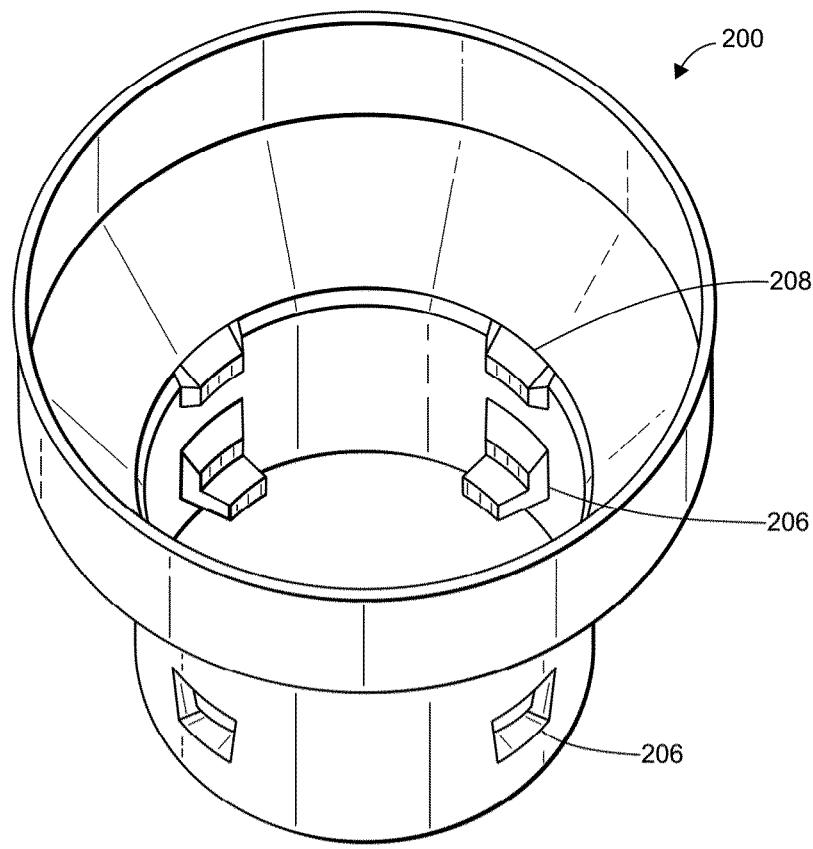
FIG. 20 is a perspective view of an exemplary ring funnel.

The pulp catcher 170 is shown positioned within the filter 110 on the filter floor 114 in FIGS. 4-6. The pulp catcher 170 is shown in more detail in FIGS. 7-9 and FIGS. 15-16. An alternative adjustable pulp catcher 170' is also shown in FIGS. 17-19. The pulp catcher 170 preferably fits loosely in the filter 110 so it can be installed prior to adding the almond mixture to the filter 110 and then be removed by the plunger mechanism 120 (because the first part of the connector 160 is interconnected with (latches to) the second part of the connector 162).

The shown exemplary pulp catcher 170 includes a body 172 (shown as a circular disk to fit within a cylindrical filter 110) and an associated (e.g. integral or removable and/or replaceable) centrally-located second part of the connector 162 (e.g. a ball stem) on the top surface of the body 172. The pulp catcher 170 (in conjunction with the plunger head 130 and clearing blades 140) holds the pulp 90 (preferably as the pulp cake 90') until the plunger mechanism 120 and pulp catcher 170 are lifted out and the pulp 90 is removed for other use. The pulp catcher 170 (and particularly the second part of the connector 162 when used in combination with the first part of the connector 160) helps to determine the amount of pulp 90 that will be retained.

The pulp catcher body 172 preferably has a plurality of openings 174 defined therein. The openings 174 are preferably of a suitable size to allow the milk 80 to pass through to the floor filter holes 116. An annular rim 176 (which may stiffen the body 172) may project downward from the annular edge of the body 172. The bottom surface of the body 172 may also include at least one spacer bump 178. The annular rim 176 and/or the spacer bump(s) 178 may assist in holding the pulp catcher body 172 off (above and spaced from) the filter floor 114 so the floor filter holes 116 remain unobstructed (remain free from pulp and unclogged) and, therefore, available to process the mixture 70. The annular rim 176 and/or the spacer bump(s) 178 may help distribute the pressure (physical force against the filter floor 114) applied by the descending plunger head 130. The annular rim 176 and/or the spacer bump(s) 178 may help prevent the deformation of the filter floor 114. The annular rim 176 and/or the spacer bump(s) 178 may aid in keeping the second part of the connector 162 upright when inserting the pulp catcher 170 into the filter 110 prior to adding the mixture for processing.

The second part of the connector 162 is shown as having an enlarged upper part (ball) with a narrower lower part (stem). At least part of the upper part (ball) has a diameter that is longer than the diameter of the lower part (stem). This preferably creates an overhang between the upper part (ball) and the lower part (stem) that can be "grabbed" by the connector segments 160a, 160b of the first part of the connector 160. The shown upper part (ball) is pointed to help divide the connector segments 160a, 160b. The second part of the connector 162 of the pulp catcher 170 may have a pre-set or predetermined height for the particular plant mixture 70 to be filtered so that the leftover pulp 90 is captured and made into a pulp cake 90'. Put another way, the height of the second part of the connector 162 is the approximate distance needed between the upper surface of the pulp catcher body 172 and the lower surface of the plunger head 130 to create a pulp cake 90' of a particular consistency (e.g. not runny) for a particular quantity of a particular recipe of plant mixture 70.

Alternatively, the second part of the connector 162 may be adjustable so that different mixtures and/or different quantities can be processed. FIGS. 17-19 show an alternative embodiment of the pulp catcher 170' with an adjustable second part of the connector 162' (e.g. an adjustable ball stem). The shown adjustable ball stem has two interconnecting subcomponents: a post 164' and a cap 166'. The shown post 164' (having an exterior annular surface that is at least partially threaded) and cap 166' (having a cavity with an interior annular surface that is at least partially threaded) are screwably interconnected such that they could have different heights. For example, FIG. 18 shows an exemplary "tall" height and FIG. 19 shows an exemplary "short" height. The adjustable second part of the connector 162' is height adjustable for different processing requirements. For example, processing seeds from raspberries produces a larger amount of pulp as compared to the amount of pulp produced in processing almond milk. It would be advantageous, therefore, to have an adjustable second part of the connector 162' that preferably allows lesser/greater space between the upper surface of the body 172' of the pulp catcher 170' and the lower surface of the plunger head 130. There may be a small ridge seal at the base of the post 164' to keep liquid and food particles out of the space between the post 164' and the cap 166'.

The plunger head 130 interconnects with (latches onto) the pulp catcher 170. More specifically, the first part of the connector 160 (associated with the plunger head 130) automatically interconnects with (latches onto) the second part of the connector 162 (associated with the pulp catcher 170) when a predetermined bottom is reached. This automatic interconnection occurs when the plurality of connector segments 160a, 160b are forced apart by the introduction therebetween of the upper part (ball) of the second part of the connector 162. The upper part (ball) of the second part of the connector 162 forces the plurality of connector segments 160a, 160b apart. Once past the enlarged upper part (ball) of the second part of the connector 162, the plurality of connector segments 160a, 160b at least substantially return to their original shape (although they may be held slightly apart by the lower part (stem) of the second part of the connector 162) trapping the enlarged upper part (ball) of the second part of the connector 162 therebetween. This effectively interconnects (latches) the plunger head 130 to the pulp catcher 170.

Ring Funnel

An exemplary ring funnel 200 is shown in FIGS. 2-6 and FIGS. 20-21. The ring funnel 200 has an upper funnel opening 222 and a lower funnel opening 224. The ring funnel 200 is preferably positioned so as to functionally direct milk 80 exiting the filter 110 into the container 250. Put another way, the filter 110 preferably is connected functionally to the ring funnel 200 in that milk 80 from the filter 110 is gathered and guided by the ring funnel 200, and the ring funnel 200 is functionally connected to the container 250 in that the milk 80 gathered and guided by the ring funnel 200 flows to the container 250. Exemplary flow of the milk 80 is shown in FIG. 5 as balloon arrows. For example, milk 80 that has been expressed from the filter 110 may be pushed toward the inner diameter of the ring funnel 200. Some of the milk 80 may come in contact with the inner diameter of the ring funnel 200 and begin to flow downward. Gravity may cause some of the milk 80 to begin to flow downward. The milk 80 is then shown as flowing downward, through the annular channel 210 defined between the outer diameter of the filter 110 (outer surface of the wall 112) and the inner diameter of the ring funnel 200, and into the container 250.

The shown exemplary filter 110 is shown as having a wider "gathering" upper ring funnel section and a narrower "guiding" lower ring funnel section. The actual shape and width of the sections could be adjusted including having the "gathering" and "guiding" ring funnel sections having the same shape (e.g. both tubular or both conical) and/or diameter.

As shown, the filter 110 is at least partially positioned within the ring funnel 200, and the ring funnel 200 is at least partially positioned within the container 250. The annular wall of the ring funnel 200 extends at least partially around the lower portion of the filter 110. While the shown filter ring funnel 200 extends around the approximately lower half of the filter 110, the ring funnel 200 could extend around the entire filter 110.

When the filter 110 is positioned within the ring funnel 200, the bottom supports 206 (filter stops) support the filter 110 and centering supports 208 (alignment guides) center the filter 110 to create an annular channel 210 (e.g. an annular gap of approximately 6.35 mm (approximately 0.25 inches) that is defined between the inside of the ring funnel 200 and the outside of the filter 110).

The ring funnel 200 may perform at least some of the following functions: filter support, funnel/container interface, milk gathering, milk guiding, and splash guard. The ring funnel 200 may perform each of these functions alone or a plurality of these functions in combination (simultaneously).

The ring funnel 200 provides filter support using, for example, bottom supports 206 (filter stops) and/or centering supports 208 (alignment guides). Bottom supports 206 support the filter floor 114 from the bottom. Put another way, the filter floor 114 rests on the shelves provided by the bottom supports 206. Centering supports 208 support the annular filter wall 112. The inwardly projecting centering supports 208 hold the filter wall 112 in a spaced relationship with the interior surface(s) of the ring funnel 200. The centering supports, therefore, create an annular channel 210 between the outer surface of the filter wall 112 and the interior surface of the ring funnel 200.

The ring funnel 200 has filter stops and alignment guides, and directs the milk 80 extracted from the filter 110 into the container 250 through an approximately 6.35 mm (approximately 0.25 inches) annular channel 210 between the inside of the ring funnel 200 and the outside of the filter 110. The ring funnel 200 can be raised high enough up above the filter 110 to direct all the milk, including milk that might squirt though one of the filter holes 116, into the container 250.

The funnel/container interface may be accomplished in many ways. As shown, the mouth (upper annular rim) of the container 250 interacts with the outer surface 204 of the ring funnel 200 (shown as the outer surface of the wider "gathering" upper ring funnel section). Alternatively, there could be clips or other mechanisms to facilitate or assist with the funnel/container interface.

The ring funnel 200 gathers at least some of the milk 80 (which is represented as with balloon arrows in FIG. 5) as it is expressed from the annular wall 112 of filter 110. A wider "gathering" upper ring funnel section of the shown exemplary filter 110 is shown gathering at least some of the milk 80 as it is expressed from the filter wall 112.

The ring funnel 200 guides at least some of the milk 80 into the container 250. A narrower "guiding" lower ring funnel section of the shown exemplary filter 110 is shown guiding at least some of the milk 80 as it is expressed from the filter wall 112.

As shown, the filter 110 may be at least partially positioned within the ring funnel 200. The annular wall of the ring funnel 200, therefore, may prevent splashing (incidental squirts) during processing step 44. The ring funnel 200 may be even taller than the filter wall 112 to direct all the milk, including milk that might be expelled though one of the filter holes 116 in the top of the filter 110.

While the ring funnel 200 may be needed to allow the nut milk product to pass into the container 250, the exact shape and size could be modified to accommodate larger and/or smaller filters 110 and/or containers 250. In addition, the ring funnel 200 could be made integral with the filters 110 and/or containers 250.

Container

The shown exemplary container 250 preferably makes the processing systems 100 organized, stable, easy, and fast. The shown container 250 may be a 2.89 liters (approximately 2.00 quarts) container that is designed to resemble a classic milk can. Different designs may be used. The container 250 may be scaled up or down in size as needed depending on the quantity of milk 80 being processed. For example, the container 250 may be scaled to hold anywhere from approximately 0.95 to 3.79 liters (approximately 1.00 to 4.00 quarts). The container 250 may have a pour spout, a lid, and/or a cap.

The container may be the container supplied with a plant mixture processing system. Alternatively, the container may be a container supplied by the user. (If the container is supplied by the user, some adjustments (retrofitting) to the ring funnel may be necessary.)

Alternatives and Variations

Many of the variations for the processing systems 100 described herein are discussed along with their functional equivalent. The following is just a few of the alternatives and variations that could be used interchangeably.

The connectors 160, 162 are meant to be exemplary. For example, although a first part of a connector 160 is shown as a socket latch and/or flexible catch with connector segments 160a, 160b and a second part of a connector 162 is shown as a ball stem, the opposite could be true. Specifically, the first part of the connector could be a ball stem and the second part of the connector could be a socket latch and/or flexible catch with connector segments. Alternative connectors (e.g. magnets, hooks/loops, "snaps," and other two-part connectors known or yet to be discovered) could also replace the shown connectors 160, 162.

Figure 22:
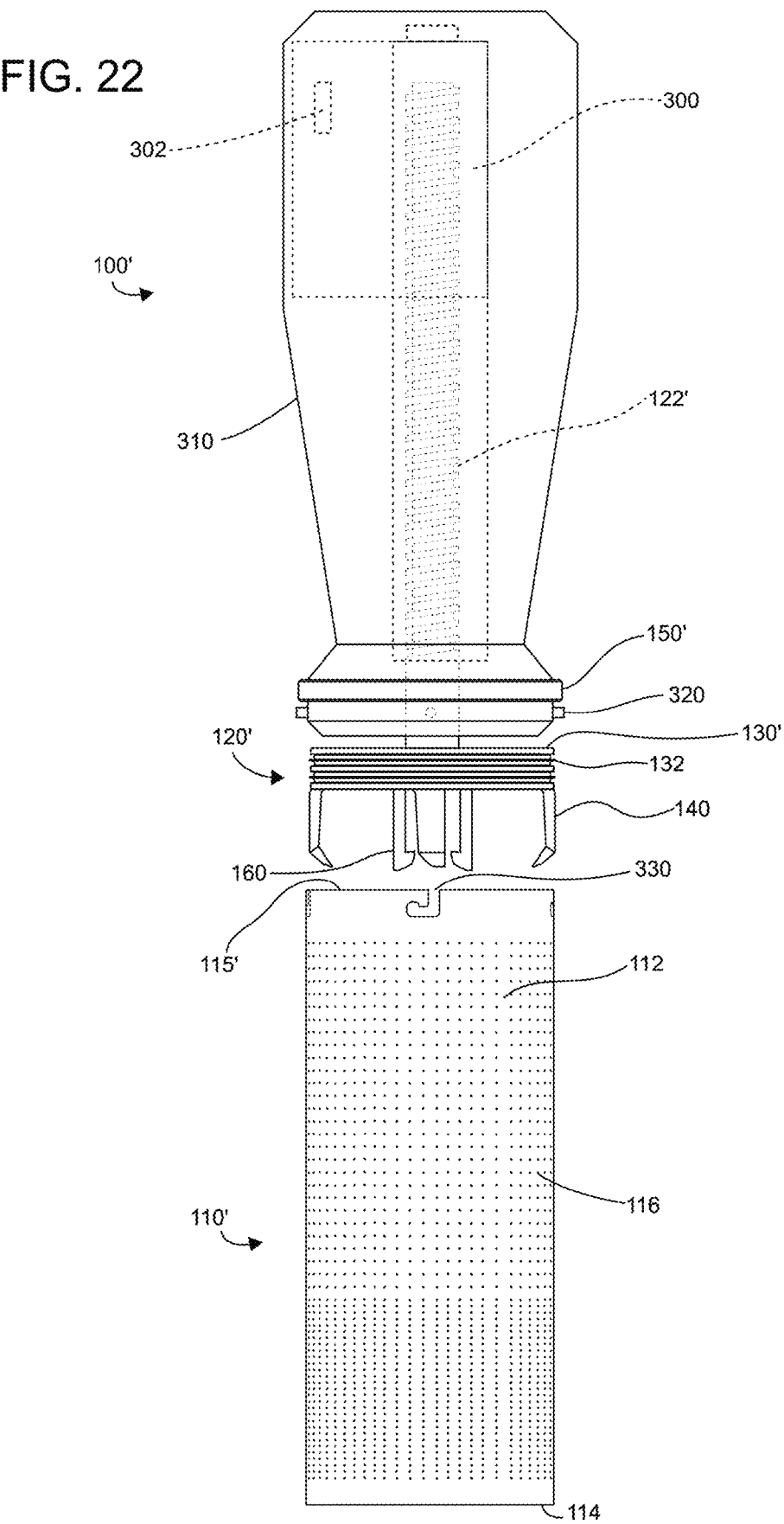
FIG. 22 is a side view of an exemplary alternative motorized plant mixture processing system.

FIG. 22 shows an alternative processing system 100' that includes an alternative filter 110' and an alternative plunger mechanism 120'. The plunger mechanism 120' is shown with an alternative at least partially threaded shaft 122', an alternative plunger head 130' (similar to plunger head 130, but with alternative connector segments 160'), and an alternative filter lid 150'. This processing system 100' is shown as being motorized (e.g. using a motor 300 such as a linear actuator 300 that is preferably associated with a gear reduction device, either or both of which may be battery operated). The motor 300 is shown positioned within a housing 310 and having at least one activator or switch 302. Mechanical structure (e.g. clips and/or posts) may be used to hold the motor 300 in place. The bottom of the housing 310 is or includes the filter lid 150' that includes a first part of a lid securer 320 (shown as at least one post). The annular filter wall rim 115' (the top of the filter 110') includes a second part of a lid securer 330 (shown as keyhole slots or L-shaped notches). The first part of a lid securer 320 and the second part of a lid securer 330 interact to secure the filter lid 150' to the filter 110'. The motor 300 functions much like a user manipulating the actuator 124. Specifically, the motor 300 provides the power behind the rotating/lowering movement of the plunger head 130' and/or clearing blades 140. If the motor 300 is a linear actuator, it may use gear reduction to increase the power and slow the downward speed of the plunger head 130'. When activated, motor 300 drives the plunger head 130 to a predetermined point so the connector segments 160' interconnect (latch) with the corresponding connector segment structure (not shown) of the pulp catcher (not shown). As the motor 300 rotates the at least partially threaded shaft 122', the plunger head 130 and clearing blades 140 clear the filter holes 116. Alternatively the plunger head 130 does not rotate during this motorized process to reduce wear of the plunger gaskets 132. Upward retrieval motion may be activated by one of the at least one activators or switches 302. Preferably, there is a safety switch (which may be one of the at least one activators or switches 302) that stops the motion if the resistance of the circuit is too high. A resistance and/or mechanical sensor may be used to automatically stop the rotating and/or lowering motion.

Figure 23:
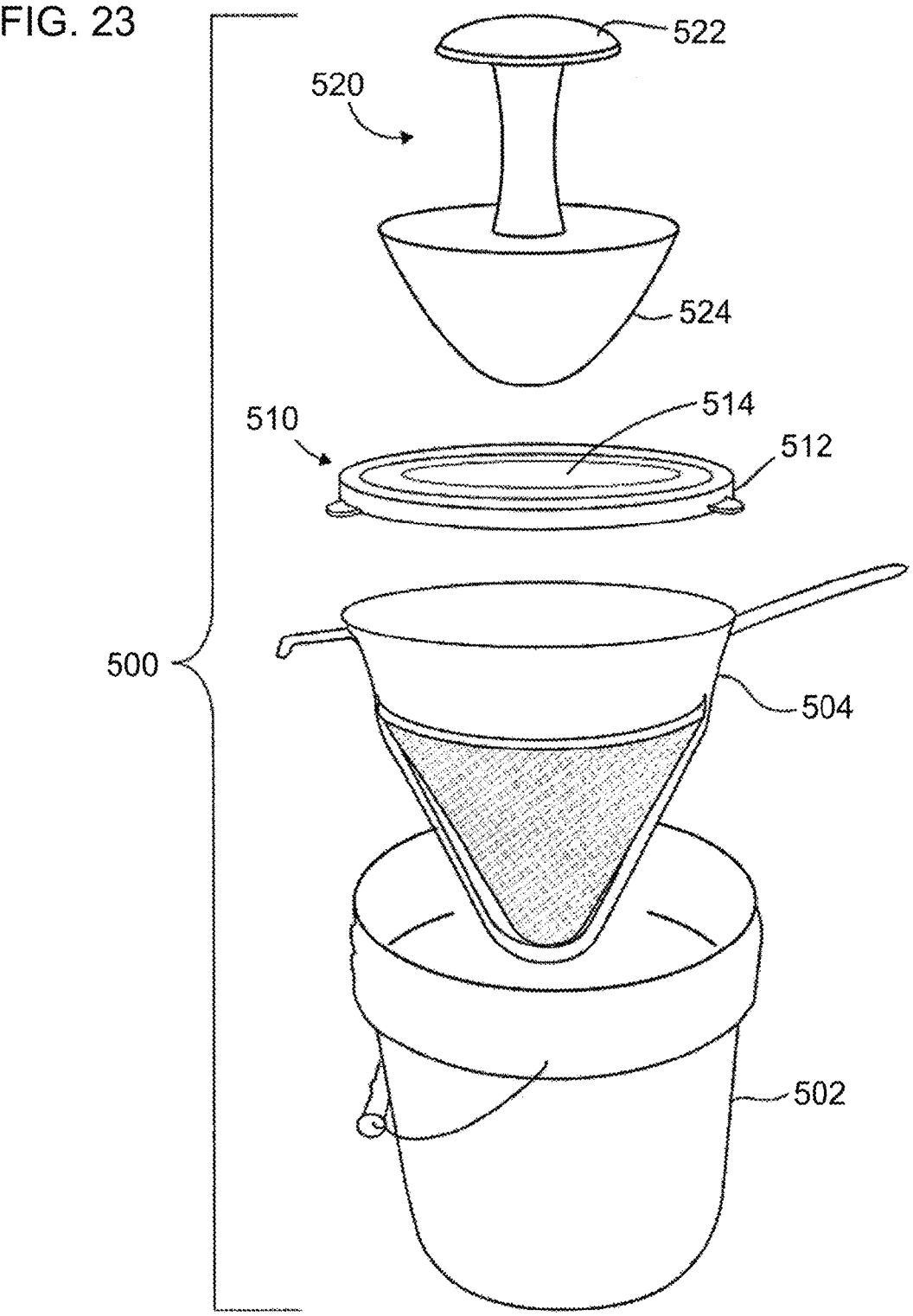
FIG. 23 is an exploded view of an exemplary alternative simplified plant mixture processing system.

FIG. 23 shows an alternative simplified plant mixture processing system 500 that may be sized to fit on a countertop or similar surface. The simplified plant mixture processing system 500 preferably includes a food grade container 502 (container 502), a fine chinois mesh filter 504 (chinois filter 504), a stretch silicone cover 510 (stretch cover 510), and a mortar 520 (having a mortar handle 522 and a pressure surface 524). The container 502 is shown as a bucket that can hold the finished milk. The stretch cover 510 preferably has an outer annular filter engager 512 (shown as an annular downward flange) and a central passage 514 through which the mortar handle 522 may be positioned. The stretch cover 510 is used to pressurize the chinois filter 504. The mortar 520 further pressurizes the chinois filter 504, which effectively forces the milk from the plant mixture 70 through the chinois filter 504 into the container 502. In operation, a blender 60 is used to blend the plant mixture 70. The chinois filter 504 is positioned within the container 502 so that the mouth of the chinois filter 504 is within (although it may be above) the mouth of the container 502. The blended plant mixture 70 is loaded into the chinois filter 504. The mortar 520 (and particularly the pressure surface 524) is then placed on top of the blended plant mixture 70. The stretch cover 510 is secured to the container 502 (the annular filter engager 512 gripping the mouth of the container 502) with the mortar handle 522 extending through the central passage 514. (Alternatively, the stretch cover 510 could be secured to the container 502 and then the pressure surface 524 could be forced through the cover's central passage 514.) Pushing down on the blended plant mixture 70 with the mortar 520 forces the milk from the plant mixture 70 through the chinois filter 504 into the container 502. The pulp 90 is trapped within the chinois filter 504. This simplified plant mixture processing system 500 shows the advantage of pressurization of the plant mixture 70 through a chinois filter 504 which speeds the process of creating extracted milk.

The materials from which the components of the processing systems discussed herein are constructed may be adapted to accommodate the intended use of the components. Exemplary components (e.g. the shaft 122, the actuator 124, the pulp catcher 170, the ring funnel 200, and/or the container 250) may be made from metals such as, for example, stainless steel. Exemplary components (e.g. the actuator 124, the plunger head 130, the gaskets 132, the clearing blades 140 the pulp catcher 170, the ring funnel 200, and/or the container 250) may be made from plastics such as, for example, a semi-rigid plastic (e.g. polypropylene or polyethylene). Some components may be made of alternative materials such as rubber (e.g. the gaskets 132, the clearing blades 140), silicone (e.g. the gaskets 132, the clearing blades 140), glass or ceramics (e.g. the ring funnel 200 and/or the container 250). The materials from which the components are made are intended to be suitable for the intended use of the components. For example, materials being exposed to food are preferably food grade and National Sanitation Foundation (NSF) approved for food safety. Another example is that materials are preferably dishwasher safe (i.e. sanitation and high temperature resistant). Yet another example is that materials are preferably free from harmful chemicals (e.g. BPA).

This processing system described herein can be made larger or smaller as needed. For example, to filter up to approximately one gallon of plant mixture 70, components (e.g. the filter 110, plunger mechanism 120, ring funnel 200, and container 250) of a processing system may be enlarged. A container 250 could be larger and still accept the ring funnel 200 and the filter 110. The filter 110 alone could be modified with cuts in the bottom annular rim (e.g. the annular bottom edge of the wall and/or the perimeter of the floor 114) of the filter 110 that would allow the milk 80 to pass through so it could be used in a large bowl without the benefit of a ring funnel 200 or specifically designed container 250.

Obtaining Milk from Plant Material

This method for using the plant mixture processing system 100 to obtain milk 80 from plant material 70 is meant to be exemplary. It is also meant to further the understanding of how the processing system 100 functions.

As shown in FIG. 1, disclosed herein are steps and components used to separate milk 80 and pulp 90 from a plant mixture 70 (blended ingredients 50, 52, 54) by using a blender 60 and a plant mixture processing system 100 (also referred to as a "processing system 100"). Put another way, FIG. 1 shows a generalized preferred processing system 100 that can be used to process milk 80 from a blended plant mixture 70. Ingredients 50, 52, 54 are loaded in the loading step 40 into a blender 60 where they are blended in the blending step 42 to create a plant mixture 70. The plant mixture 70 is then transferred to the processing system 100 (which preferably includes a filter 110, a plunger mechanism 120 (having at least one clearing blade 140), and a pulp catcher 170). The processing system 100 then processes the plant mixture 70 in the processing step 44 (which includes extracting and preferably has a homogenizing-like effect on the resulting milk 80) to separate milk 80 from pulp 90. The milk 80 may be stored (using the storing step 46) in a container 250. The pulp 90 may be removed (cleaned) (using the removing/cleaning step 48) from the processing system 100 and held in a pulp holder 92.

In a preparation step (not shown), prior to adding the almond mixture to the filter 110, a pulp catcher 170 may be placed into the bottom of the filter 110 with the second part of the connector 162 facing up. As shown in FIG. 4, in this position, the connector 162 will be ready to mate with the first part of a connector 160 when the plunger mechanism 120 reaches the end of its cycle. If the second part of the connector 162 is adjustable, it could be adjusted based on the intended recipe.

Figure 3:
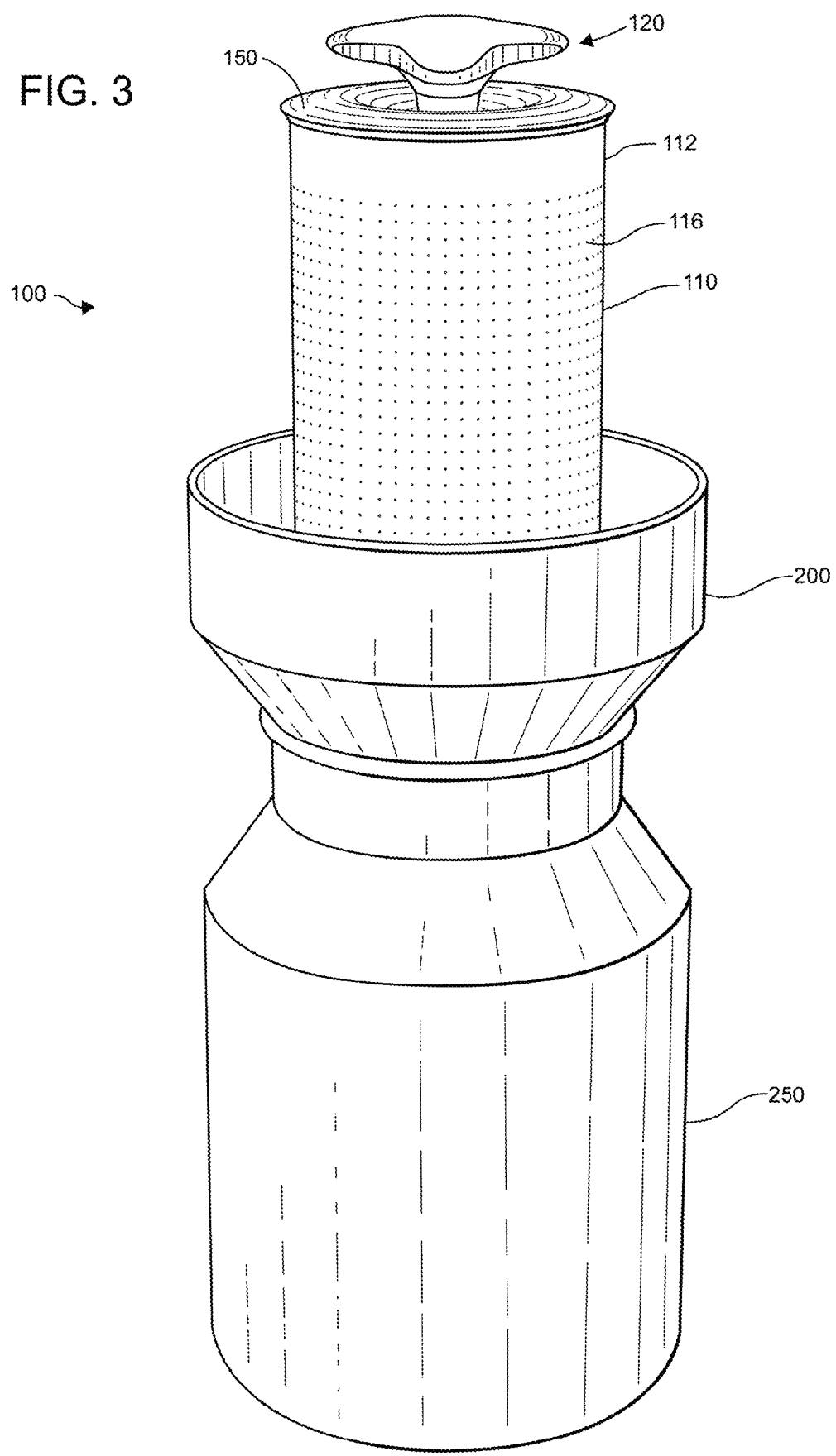
FIG. 3 is a perspective view of the preferred exemplary plant mixture processing system.

In another preparation step (FIGS. 2 and 3), the ring funnel 200 may be inserted into the container 250, and then the filter 110, and then the filter 110 may be inserted into the ring funnel 200. As shown in FIG. 3, in this configuration, the filter 110 is above and at least partially within the ring funnel 200, and the ring funnel 200 is above and at least partially within the container 250.

In yet another preparation step (not shown), ingredients can be prepared and measured per a recipe. For example, fluid can be chilled (e.g. lowering the temperature using ice and/or refrigeration) or heated. Chilling, for example, can change and/or improve the texture of the final product. The ingredients can also be measured into their appropriate amounts per a recipe.

Other optional preparation steps (not shown) could include cleaning any components that require cleaning, and gathering any additional items (e.g. a knife 190, a plate (pulp holder 92), and/or a blender).

The loading step 40 includes inserting ingredients (plant material 50, fluid 52, and optional additional ingredients 54) into a variable speed blender 60 for blending step 42. For an exemplary blending almond milk, the blending may begin with a slow speed and increase to a fast speed in order to grind the ingredients 50, 52, 54 (e.g. ¾ cup almonds and 3½ cups water) for a predetermined time (e.g. two minutes). The resulting almond mixture is poured into the filter 110 slowly and steadily.

FIG. 4 shows the filter 110 positioned within the ring funnel 200 with the filter stops 206 and filter alignment guides 208 aligning and holding the filter 110. The filter 110 is shown as at least partially filled with plant mixture 70 prior to pressurizing the filter 110 with the plunger head 130. The plunger mechanism 120 is shown as being positioned so that the plunger head 130 is within the filter 110, the filter lid 150 is associated with the annular filter wall rim 115, and the actuator 124 is above the upper lid surface 156 of the filter lid 150.

FIG. 5 shows the actuator 124 lowering in the filter 110. As set forth, the gasket-sealed plunger mechanism 120 preferably pressurizes the filter 110 and forces the plant mixture 70 through the filter holes 116 of the filter 110. When the gaskets 132 interact with the smooth interior inner surface of the wall 112 of the filter 110, the filter chamber 111 (the inside of the filter 110) is sealed for pressurizing the plant mixture 70 within the filter 110. Initially, because the shaft 122 of FIG. 5 does not have external threading, the plunger mechanism 120 can be pushed down quickly (and without mandatory rotation required in processing systems 100' having a threaded plunger shaft 122' as shown in FIG. 22). Once the plunger mechanism 120 makes contact with the plant mixture 70, however, pressure is preferably applied slowly and steadily. The lower the plunger mechanism 120 is pushed down, the harder it will get to apply pressure. Between the position of the plunger head 130 shown in FIG. 5 and the position of the plunger head 130 shown in FIG. 6, the actuator 124 can be rotated to rotate the clearing blades 140 (FIGS. 12-14) creating a rotating/lowering movement (theoretically, the rotating and lowering may be performed at least substantially simultaneously or they may be done alternatingly) and shaving particles of pulp 90 that are clogging the filter holes 116 and thereby make it easier to continue the downward progress. The user may rotate the actuator 124 to clear the clogged filter holes 116 whenever the downward movement becomes difficult. The processing process is dynamic. The lower filter holes 116 in the filter 110 naturally receive more pulp 90 and are more likely to clog partially which reduces the particle size expressed. This rotating/lowering process is repeated until the bottom of the actuator 124 the second part of the connector 162 of the pulp catcher 170 interconnects with (latches onto) the first part of the connector 160 of the plunger head 130. The processing step 44 takes approximately 1.0 to 3.0 minutes (and usually about 1.5 minutes) to complete.

FIG. 5 also shows the direction of the flow of the milk 80 through the filter holes 116 of the filter 110, through the ring funnel 200, and ultimately, the milk 80 within the container 250. It should be noted that milk 80 expressed from the higher filter holes 116 may "squirt" or "spray" outward (shown as balloon arrows) to the interior walls of the ring funnel 200. This milk 80 joins milk 80 expressed from the lower filter holes 116 as it travels (shown as balloon arrows) between the annular channel 210 defined between the outer diameter of the filter 110 and the inner diameter of the ring funnel 200. Finally, this milk 80 joins the milk 80 expressed from the filter holes 116 of the filter floor 114 as it enters (shown as balloon arrows) the container 250.

FIG. 6 shows the final position of the first part of the connector 160 located on the plunger head 130 interconnected (latched) to the second part of the connector 162 located on the pulp catcher 170. The pulp 90 that remains did not exit through the filter holes 116 and remains within the filter 110. Put another way, the relatively large particles of pulp 90 are captured at the bottom of the filter 110 between the bottom surface of the plunger head 130 and the top surface of the pulp catcher 170. The clearing blades 140 also help to retain the pulp 90. The plurality of connector segments 160a, 160b of the first part of the connector 160 are made to open when the first part of the connector 160 makes contact with the second part of the connector 162 of the pulp catcher 170 and latch onto the second part of the connector 162 when the plunger head 130 is pushed down to the engagement point. Alternative connectors 160, 162 could interact differently, but provide the same basic function. The lower surface of the actuator 124 may contact with the upper lid surface 156 of the filter lid 150 to indicate the process is complete. When the pulp catcher 170 is interconnected (latched) with the plunger mechanism 120, the plunger mechanism 120 is ready for the removal and retrieval of pulp 90.

Next, the filter 110 is removed by holding it with one hand while the filter lid 150 is loosened and the plunger mechanism 120 is pulled out steadily. FIG. 7 shows the plunger mechanism 120 (with the pulp 90 secured therein) removed from the filter 110 for retrieval of the pulp cake 90', 90". The pulp catcher 170 is on the bottom and is interconnected (latched) to the plunger head 130. The pulp catcher 170 may be removed by separating the connector parts 160, 162. Depending on the type of the connector used, this may be accomplished by sliding, prying, and/or pulling the second part of the connector 162 away from the first part of the connector 160. Separating the connector parts 160, 162 facilitates the removal of the pulp cake 90' from pulp catcher 170 (and the bottom of the plunger head 130, if necessary). As shown in FIGS. 8 and 9, removal of the pulp cake 90', 90" may be accomplished, for example, by using a remover 190 (e.g. a knife as shown in FIG. 8) or tapping (FIG. 9) the pulp catcher 170 (e.g. tapping with a finger or tapping the pulp catcher 170 on the pulp holder 92). When the pulp 90 is removed, it may be done carefully so that it forms a relatively solid unit (the pulp cake 90' of FIG. 8) or may be quickly removed in pieces or chunks (pulp cake 90" of FIG. 9). As the pulp cake 90', 90" can be used for a variety of purposes (e.g. baking, in cosmetics, or as animal feed), it is valuable. Disposal of pulp 90, however, is common because of the difficulty, mess, and time commitment associated with separating and saving the pulp when producing milk with known competitors' "milkers" or "melkers." The processing systems 100 (including the pulp catcher 170 and the plunger mechanism 120) described herein, work well for the purpose of removing the valuable pulp easily, without significant mess, and in a fraction of the time compared to other devices such as those that require the manual cleaning a nut bag or removing the pulp 90 from the bottom of a container 250.

Miscellaneous

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A processing system for processing plant mixture into milk and pulp, said system comprising:
   (a) a filter, comprising:
      (i) a filter wall, said filter wall having a filter wall rim, and said filter wall having filter holes defined therein;
      (ii) a filter floor, said filter floor having filter holes defined therein; and
      (iii) said filter wall and said filter floor defining a filter chamber;
   (b) a plunger mechanism, comprising:
      (i) a plunger shaft having an actuator end and a plunger head end;
      (ii) an actuator at said actuator end of said plunger shaft, said actuator for controlling raising, lowering, and/or rotating movement of said plunger mechanism; and
      (iii) a plunger head at said plunger head end of said plunger shaft, said plunger head insertable into said filter chamber, said plunger head having an upper surface, a lower surface, and an outer annular surface; and (c) a ring funnel having an upper funnel opening and a lower funnel opening, said filter positioned at least partially within said ring funnel with said filter floor between said upper funnel opening and said lower funnel opening, said ring funnel having at least one bottom support, said filter floor supported by said at least one bottom support between said upper funnel opening and said lower funnel opening, said ring funnel for directing milk exiting through said lower funnel opening into a container.

2. The processing system of claim 1, said ring funnel having at least one centering support, said at least one centering support holding said filter wall in a spaced relationship with said ring funnel.

3. The processing system of claim 1, said ring funnel having at least one bottom support and at least one centering support, said filter floor supported by said at least one bottom support between said upper funnel opening and said lower funnel opening, said at least one centering support holding said filter wall in a spaced relationship with said ring funnel.

4. The processing system of claim 1, said ring funnel directing milk exiting through said filter holes defined in said filter floor into said container.

5. The processing system of claim 1, said ring funnel directing milk exiting through said filter holes defined in said filter wall into said container.

6. The processing system of claim 1, said ring funnel 1 directing milk exiting through said filter holes defined in said filter floor into said container, and said ring funnel directing milk exiting through said filter holes defined in said filter wall into said container.

7. The processing system of claim 1, said filter having an outer diameter and said ring funnel having an inner diameter, an annular channel defined between said outer diameter of said filter and said inner diameter of the ring funnel, said ring funnel for directing milk exiting through said lower funnel opening through said annular channel and into said container.

8. The processing system of claim 1, wherein said lower surface of said plunger head has at least one clearing blade, each clearing blade having at least one shaving edge.

9. The processing system of claim 1, wherein said lower surface of said plunger head has at least one clearing blade, each clearing blade having at least one shaving edge, wherein said at least one shaving edge clears pulp from said filter wall surrounding said filter chamber when said plunger mechanism is rotated.

10. The processing system of claim 1, further comprising at least one annular gasket, said at least one annular gasket surrounding said outer annular surface of said plunger head to form a gasketed plunger head, wherein said filter chamber is pressurized as said plunger head is lowered within said filter chamber.

11. The processing system of claim 1, further comprising a connector having a first part and a second part, said first part of said connector associated with said lower surface of said plunger head, a pulp catcher having a body and said second part of said connector, said body of said pulp catcher positioned in said filter chamber above said filter floor, said second part of said connector for interconnecting with said first part of said connector when said plunger head is lowered within said filter chamber.

12. A processing system for processing plant mixture into milk and pulp, said system comprising:
(a) a filter, comprising:
  (i) a filter wall, said filter wall having a filter wall rim, and said filter wall having filter holes defined therein;
  (ii) a filter floor, said filter floor having filter holes defined therein; and
  (iii) said filter wall and said filter floor defining a filter chamber;
(b) a plunger mechanism, comprising:
  (i) a plunger shaft having an actuator end and a plunger head end;
  (ii) an actuator at said actuator end of said plunger shaft, said actuator for controlling raising, lowering, and/or rotating movement of said plunger mechanism; and
  (iii) a plunger head at said plunger head end of said plunger shaft, said plunger head insertable into said filter chamber;
(c) a ring funnel having an upper funnel opening and a lower funnel opening, said filter positioned at least partially within said ring funnel with said filter floor between said upper funnel opening and said lower funnel opening, said ring funnel having at least one bottom support, said filter floor supported by said at least one bottom support between said upper funnel opening and said lower funnel opening; and
(d) wherein lowering said plunger mechanism expresses milk through said filter holes in said filter wall and said filter floor, said ring funnel directing milk exiting through said filter holes into a container, and thereby extracts said milk from said plant mixture.

13. The processing system of claim 12, said ring funnel having at least one centering support, said at least one centering support holding said filter wall in a spaced relationship with said ring funnel.

14. The processing system of claim 12, said ring funnel having at least one bottom support and at least one centering support, said filter floor supported by said at least one bottom support between said upper funnel opening and said lower funnel opening, said at least one centering support holding said filter wall in a spaced relationship with said ring funnel.

15. The processing system of claim 12, said ring funnel directing milk exiting through said filter holes defined in said filter floor into said container.

16. The processing system of claim 12, said ring funnel directing milk exiting through said filter holes defined in said filter wall into said container.

17. The processing system of claim 12, said ring funnel directing milk exiting through said filter holes defined in said filter floor into said container, and said ring funnel directing milk exiting through said filter holes defined in said filter wall into said container.

18. The processing system of claim 12, said filter having an outer diameter and said ring funnel having an inner diameter, an annular channel defined between said outer diameter of said filter and said inner diameter of the ring funnel, said ring funnel for directing milk exiting through said lower funnel opening through said annular channel and into said container.

19. A processing system for processing plant mixture into milk and pulp, said system comprising:
(a) a filter, comprising:
  (i) a filter wall, said filter wall having a filter wall rim, and said filter wall having filter holes defined therein;
  (ii) a filter floor; and
  (iii) said filter wall and said filter floor defining a filter chamber;

(b) a plunger mechanism, comprising:
  (i) a plunger shaft having an actuator end and a plunger head end;
  (ii) an actuator at said actuator end of said plunger shaft, said actuator for controlling raising, lowering, and/or rotating movement of said plunger mechanism; and
  (iii) a plunger head at said plunger head end of said plunger shaft, said plunger head insertable into said filter chamber, said plunger head having an upper surface, a lower surface, and an outer annular surface; and
(c) a ring funnel having an upper funnel opening and a lower funnel opening, said filter positioned at least partially within said ring funnel, said ring funnel having at least one bottom support, said filter floor supported by said at least one bottom support between said upper funnel opening and said lower funnel opening, said ring funnel for directing milk exiting through said lower funnel opening into a container.

* * * * *